US011252377B2

(12) United States Patent
Asano et al.

(10) Patent No.: US 11,252,377 B2
(45) Date of Patent: Feb. 15, 2022

(54) CAMERA DEVICE, GAS LEAKAGE CHECK SYSTEM, GAS LEAKAGE CHECK METHOD, AND GAS LEAKAGE CHECK PROGRAM

(71) Applicant: Konica Minolta, Inc., Tokyo (JP)

(72) Inventors: Motohiro Asano, Osaka (JP); Takashi Morimoto, Suita (JP); Seiichi Tsuzuki, Takatsuki (JP); Youichi Ogawa, Osaka (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 17/046,959

(22) PCT Filed: Mar. 15, 2019

(86) PCT No.: PCT/JP2019/010998
§ 371 (c)(1),
(2) Date: Oct. 12, 2020

(87) PCT Pub. No.: WO2019/220761
PCT Pub. Date: Nov. 21, 2019

(65) Prior Publication Data
US 2021/0368140 A1    Nov. 25, 2021

(30) Foreign Application Priority Data

May 16, 2018  (JP) .............................. JP2018-094867

(51) Int. Cl.
*H04N 7/18*      (2006.01)
*G01M 3/04*     (2006.01)
*G01S 19/01*    (2010.01)
*H04N 5/33*     (2006.01)

(52) U.S. Cl.
CPC .............. *H04N 7/183* (2013.01); *G01M 3/04* (2013.01); *G01S 19/01* (2013.01); *H04N 5/33* (2013.01)

(58) Field of Classification Search
CPC ........... H04N 7/183; H04N 5/33; G01M 3/04; G01S 19/01
See application file for complete search history.

(56) References Cited

U.S. PATENT DOCUMENTS

2019/0145891 A1*  5/2019  Waxman ............... G01J 3/0208
                                                              356/409
2020/0102216 A1*  4/2020  Fiedler .................. B81B 7/0038

FOREIGN PATENT DOCUMENTS

JP    2004-85239 A    3/2004
JP    2008-58037 A    3/2008

* cited by examiner

*Primary Examiner* — Kathleen V Nguyen
(74) *Attorney, Agent, or Firm* — Rankin, Hill & Clark LLP

(57) ABSTRACT

A camera device includes a cooling unit that cools an imaging element, a first generation unit that generates stored information (the stored information includes current time and a current position acquired with use of a GPS signal during an operating term of the cooling unit, operating time of the cooling unit measured during the operating term, and identification information of the camera device), a communication unit that transmits the stored information to a server device, a second generation unit that generates image capturing information (the image capturing information includes the current time and the current position acquired with use of the GPS signal during the operating term, the operating time of the cooling unit measured during the operating term, and the identification information of the camera device), and a third generation unit that generates an image associated with the image capturing information based on an infrared image captured by the imaging element during the operating term.

20 Claims, 14 Drawing Sheets

FIG. 7

| | | | |
|---|---|---|---|
| 401 | CURRENT TIME | | 401a |
| 402 | CURRENT POSITION | LATITUDE | 402a |
| | | LONGITUDE | 402b |
| 403 | OPERATING TIME | | 403a |
| 404 | NUMBER OF REPAIRS/REPLACEMENTS | | 404a |
| 405 | IDENTIFICATION INFORMATION | | 405a |

FIG. 8

| | | | |
|---|---|---|---|
| 401 | CURRENT TIME | | 401a |
| 402 | CURRENT POSITION | LATITUDE | 402a |
| | | LONGITUDE | 402b |
| 403 | OPERATING TIME | | 403a |
| 404 | NUMBER OF REPAIRS/REPLACEMENTS | | 404a |
| 405 | IDENTIFICATION INFORMATION | | 405a |

FIG. 9

| | | | |
|---|---|---|---|
| 401 | CURRENT TIME | | 401a |
| 406 | ELAPSED TIME | | 406a |
| 402 | CURRENT POSITION | LATITUDE | 402a |
| | | LONGITUDE | 402b |
| 403 | OPERATING TIME | | 403a |
| 404 | NUMBER OF REPAIRS/REPLACEMENTS | | 404a |
| 405 | IDENTIFICATION INFORMATION | | 405a |

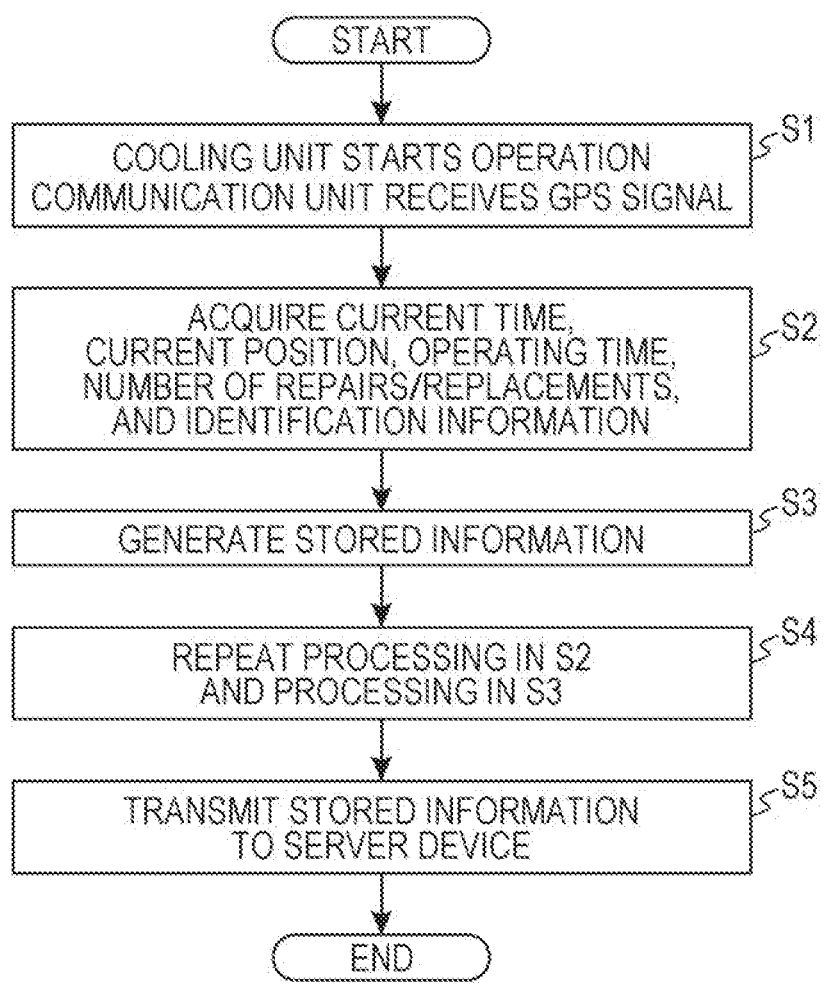

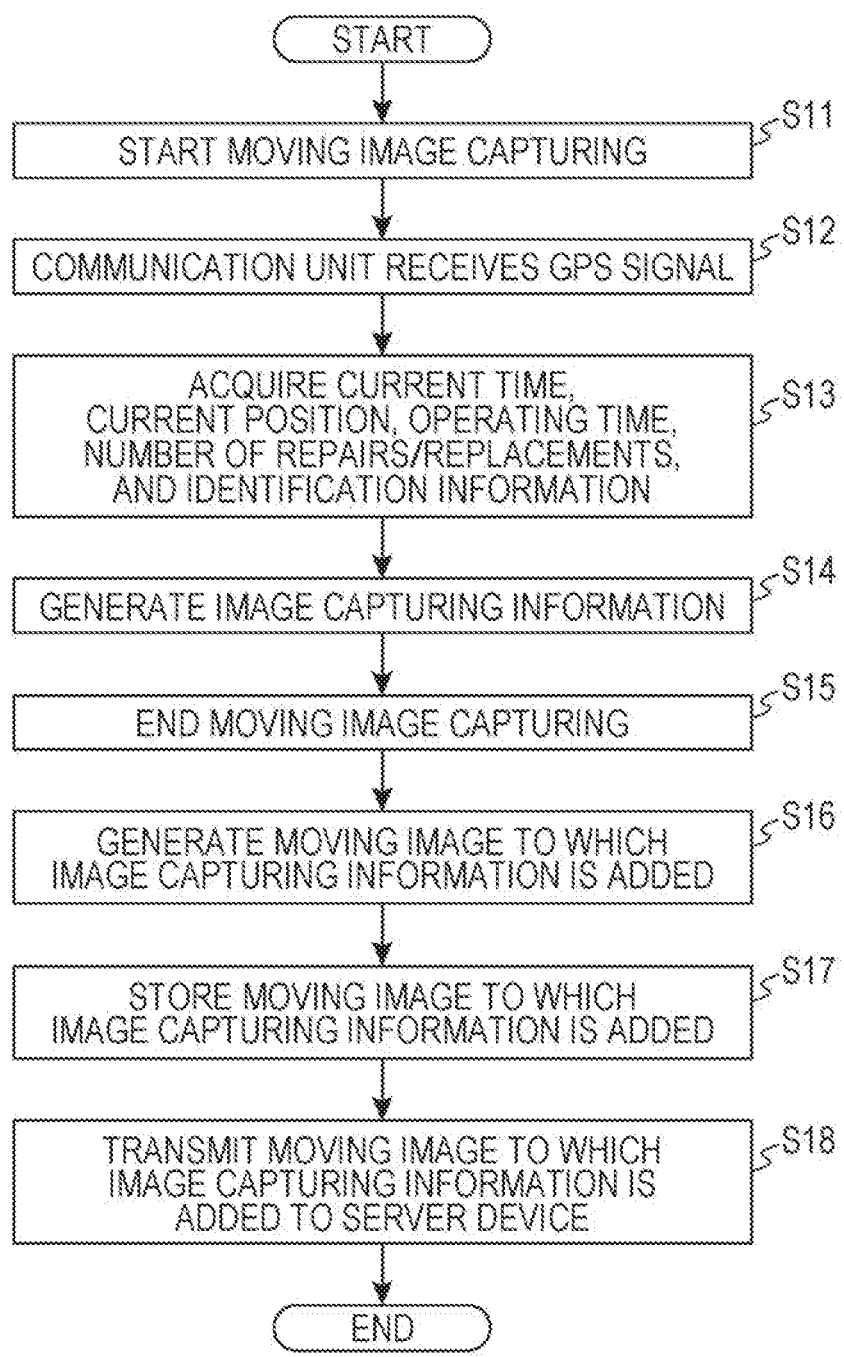

FIG. 12

IDENTIFICATION INFORMATION: 00000231        TB

| OPERATING TIME | NUMBER OF REPAIRS/ REPLACEMENTS | CURRENT TIME | CURRENT POSITION | |
| --- | --- | --- | --- | --- |
| | | | (LATITUDE) | (LONGITUDE) |
| ... | ... | ... | ... | ... |
| 1105 HOURS 10 MINUTES | 0 TIMES | 2018/3/20 10:10:32 | 35.367985 | 139.576524 |
| 1105 HOURS 20 MINUTES | 0 TIMES | 2018/3/20 10:20:40 | 35.367970 | 139.576527 |
| ... | ... | ... | ... | ... |
| 1110 HOURS 40 MINUTES | 0 TIMES | 2018/3/20 15:43:52 | 35.367982 | 139.576530 |
| 1110 HOURS 50 MINUTES | 0 TIMES | 2018/3/23 08:10:32 | 34.667584 | 135.176688 |
| ... | ... | ... | ... | ... |

RP

CHECK REPORT

DATE/TIME:
PLACE:
CHECKER:
WEATHER:
WIND SPEED:

Im —

COMPARISON INFORMATION

CAMERA DEVICE, GAS LEAKAGE CHECK SYSTEM, GAS LEAKAGE CHECK METHOD, AND GAS LEAKAGE CHECK PROGRAM

TECHNICAL FIELD

The present invention relates to a technique for checking gas leakage based on an infrared image.

BACKGROUND ART

Known is a gas leakage check with use of an infrared camera designed to have sensitivity to a wavelength band of light absorbed by gas (for example, methane) serving as a checking target. There is a case in which a checker carries an infrared camera and visits a place at which a monitoring target (for example, a gas well) is located to check gas leakage. In this check, an image captured by the infrared camera, an image capturing place, an image capturing date and time, and the like are recorded as check data. Since the check data is confirmed by a third party other than the checker, the reliability of the check data must be ensured. Meanwhile, since the checker is a person who captures the infrared image of the monitoring target with the infrared camera, the checker can be paraphrased as an image capturing person.

As a technique for improving the reliability of the check data in the gas leakage check, a technique is disclosed in Patent Literature 1, for example. Patent Literature 1 discloses a gas piping gas tight and leakage check data true-false determination method for measuring the volume and the gas leakage amount of gas piping of a dwelling unit, entering measurement value data indicating the volume and the gas leakage amount of the gas piping in a gas tight and leakage check report, when there is a need to determine whether the measurement value data is true or false, measuring the volume of the gas piping of the dwelling unit again, comparing volume measurement value data thereof with the volume measurement value data, and determining whether the measurement value data is true or false.

As a technique for improving the reliability of various measurement data measured in a work site, a technique is disclosed in Patent Literature 2, for example, although this technique is not for the check data in the gas leakage check. Patent Literature 2 discloses a position authentication device which is an electronic device including an external data input/output unit, a positional information detection unit, a date and time detection unit, an arithmetic processing unit, and a storage unit. In the position authentication device, data input from the external data input/output unit is transmitted to the arithmetic processing unit, is provided with positional information (latitude and longitude) and date and time information detected in the positional information detection unit and the date and time detection unit, is processed in a predetermined method disabling tampering, and is stored in the storage part to authenticate the position (latitude and longitude), the date, and the time of input of the data from an outside to the device.

Although the technique for improving the reliability of the check data has been proposed, a technique for improving the reliability of the check data is desired in the gas leakage check with use of the infrared camera.

CITATION LIST

Patent Literature

Patent Literature 1: JP 2008-58037 A
Patent Literature 2 JP 2004-85239 A

SUMMARY OF INVENTION

An object of the present invention is to provide a camera device, a gas leakage check system, a gas leakage check method, and a gas leakage check program enabling the reliability of check data to be improved in a gas leakage check with use of an infrared camera.

To achieve the above-mentioned object, a camera device that reflects one aspect of the present invention is a camera device for use in gas detection based on an infrared image and includes an imaging element, a cooling unit, a measurement unit, a reception unit, an acquisition unit, a storage unit, a first generation unit, a communication unit, a second generation unit, and a third generation unit. The imaging element captures the infrared image. The cooling unit cools the imaging element. The measurement unit measures operating time of the cooling unit. The reception unit receives a GPS signal. The acquisition unit acquires current time and a current position of the camera device with use of the GPS signal. The storage unit stores identification information of the camera device. The first generation unit generates stored information stored in a server device, the stored information including the current time and the current position acquired by the acquisition unit during an operating term of the cooling unit, the operating time measured by the measurement unit during the operating term, and the identification information stored in the storage unit. The communication unit transmits the stored information to the server device. The second generation unit generates image capturing information associated with an image, the image capturing information including the current time and the current position acquired by the acquisition unit during the operating term, the operating time measured by the measurement unit during the operating term, and the identification information stored in the storage unit. The third generation unit generates the image associated with the image capturing information based on the infrared image captured by the imaging element during the operating term.

The advantages and features afforded by one or more embodiments of the invention are fully understood from the detailed description given below and the accompanying drawings. The detailed description and accompanying drawings are provided by way of example only and are not intended as definitions of the limitations of the invention.

BRIEF DESCRIPTION OF DRAWINGS

FIG. 7 is an explanatory diagram illustrating an example of a template of the stored information used in the first example.

FIG. 8 is an explanatory diagram illustrating an example of a template of the image capturing information used in the first example.

FIG. 9 is an explanatory diagram illustrating an example of a template of the image capturing information used in the fourth example.

FIG. 10 is a flowchart illustrating a series of processes in which the gas detection device according to the embodiment generates the stored information and uploads the stored information to a server device.

FIG. 11 is a flowchart illustrating an operation regarding image capturing of the gas detection device according to the embodiment.

FIG. 12 is an explanatory diagram illustrating a part of an example of a list table of the stored information.

DESCRIPTION OF EMBODIMENTS

Hereinbelow, one or more embodiments of the present invention will be described with reference to the drawings. However, the scope of the invention is not limited to the disclosed embodiments.

Figure 1A:
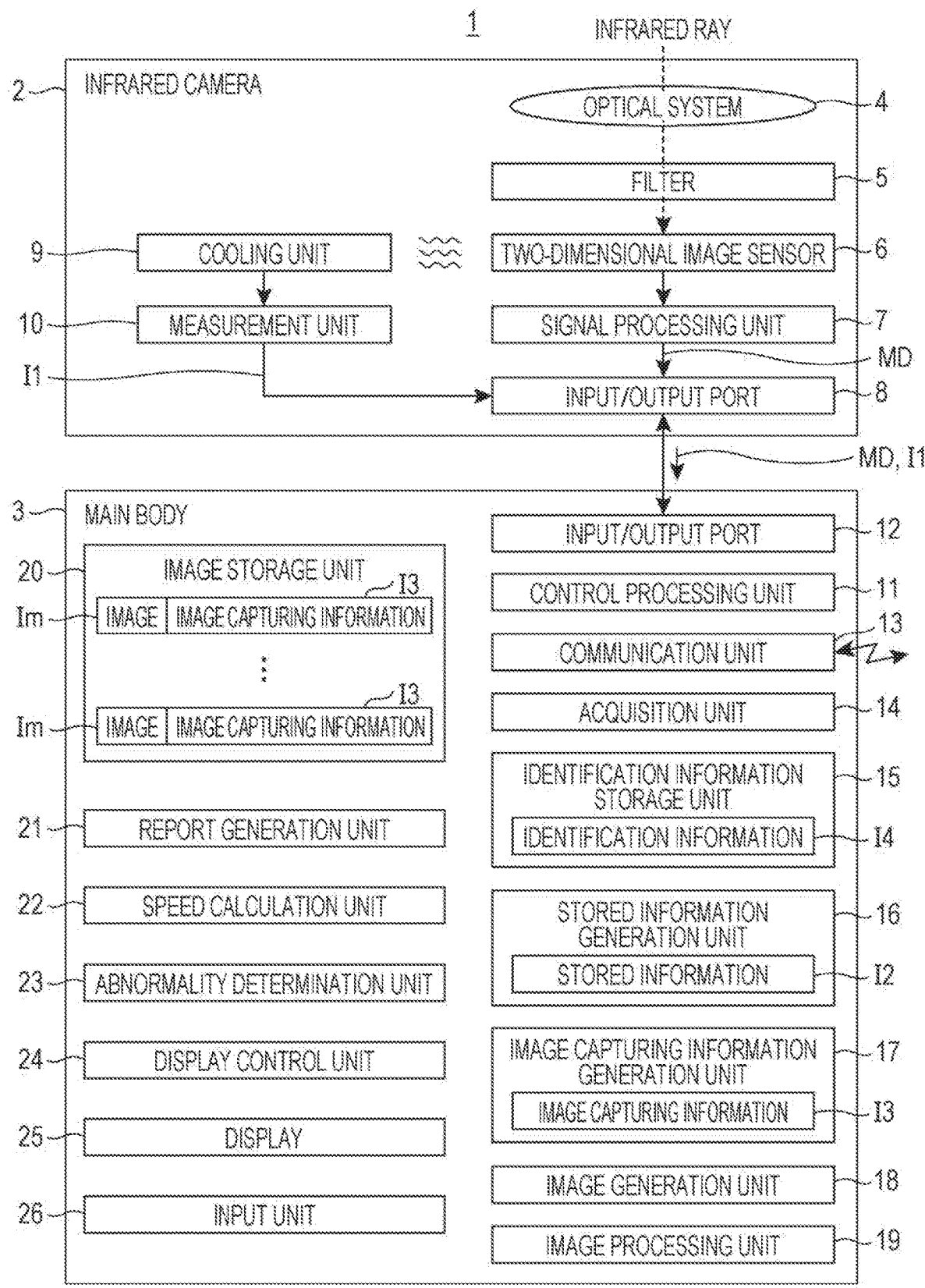
FIG. 1A is a block diagram illustrating a configuration of a gas detection device according to an embodiment.

In each of the drawings, the components denoted by the same reference signs indicate the same components, and the description of the components already described will be omitted. In the present specification, reference signs without suffixes are used for generic names (for example, an operating term T1), and reference signs with suffixes are used when referring to individual components (for example, operating terms T1-1 and T1-2). FIG. 1A is a block diagram illustrating a configuration of a gas detection device 1 according to an embodiment. The gas detection device 1 is an example of a camera device and includes an infrared camera 2 and a main body 3. The gas detection device 1 is portable, and a checker can carry the gas detection device 1 to a place at which a monitoring target for gas leakage (for example, a gas tank facility) is located.

The infrared camera 2 captures an infrared moving image of the monitoring target for gas leakage and generates moving image data MD indicating the moving image. The infrared moving image may be a plurality of infrared images captured in a time series and does not have to be a moving image. The infrared camera 2 includes an optical system 4, a filter 5, a two-dimensional image sensor 6, a signal processing unit 7, an input/output port 8, a cooling unit 9, and a measurement unit 10.

The optical system 4 forms the infrared image of the monitoring target for gas leakage on the two-dimensional image sensor 6. The filter 5 is arranged between the optical system 4 and the two-dimensional image sensor 6 and allows only infrared rays having a specific wavelength to pass there through out of light that has passed through the optical system 4. Of the infrared wavelength bands, the wavelength band that passes through the filter 5 depends on the type of gas to be detected. For example, in a case of methane, the filter 5 that allows the wavelength band of 3.2 to 3.4 μm to pass therethrough is used. The two-dimensional image sensor 6 (an example of an imaging element) is a cooled type indium antimony (InSb) image sensor, for example, and receives infrared rays that have passed through the filter 5. The signal processing unit 7 converts an analog signal output from the two-dimensional image sensor 6 into a digital signal and performs known image processing. This digital signal becomes the moving image data MD. The input/output port 8 is an interface circuit used for communication with the main body 3 and transmits the moving image data. MD to the main body 3.

The cooling unit 9 is a cooler (refrigerator) that cools the two-dimensional image sensor 6. The cooling unit 9 is a Stirling cooler, for example, and the cooling temperature is a cryogenic temperature, for example. As long as the infrared camera 2 includes the cooling unit 9 and the measurement unit 10 that measures the operating time of the cooling unit 9, the cooling unit 9 is not limited to the Stirling cooler, and the cooling temperature is not limited to the cryogenic temperature.

The measurement unit 10 is a timer (stopwatch) that measures operating time (time of operation) of the cooling unit 9. An on-term of the power of the infrared camera 2 is an operating term of the cooling unit 9. The measurement unit 10 does not reset the measured operating time even when the power of the infrared camera 2 is turned off, and when the power of the infrared camera 2 is turned on next time, the measurement unit 10 starts operating time measurement in a state of the operating time in the previous on-term. That is, the measurement unit 10 measures a cumulative value of operating time (total operating time).

The start and end of the operating term of the cooling unit 9 are not limited to turning on and off the power of the infrared camera 2. For example, a switch of the cooling unit 9 may be provided in the infrared camera 2, and the cooling unit 9 may start the operation when the switch is turned on and may stop the operation when the switch is turned off.

Only the manufacturer of the cooling unit 9 can reset the operating time measured by the measurement unit 10. For example, the operating time cannot be reset unless an ID and a password of the cooling unit 9 are input in the measurement unit 10.

The measurement unit 10 transmits operating time information I1 indicating the operating time being measured to the input/output port 8 at a predetermined time. The input/output port 8 transmits the operating time information I1 to the main body 3. The predetermined time is a time when stored information I2 and image capturing information I3 described below are generated.

The main body 3 is a computer device including as functional blocks a control processing unit 11, an input/output port 12, a communication unit 13, an acquisition unit 14, an identification information storage unit 15, a stored information generation unit 16, an image capturing information generation unit 17, an image generation unit 18, an image processing unit 19, an image storage unit 20, a report generation unit 21, a speed calculation unit 22, an abnormality determination unit 23, a display control unit 24, a display 25, and an input unit 26. The main body 3 and the infrared camera 2 may be integrated (the main body 3 and the infrared camera 2 may be housed in the same housing) or may be separated and able to communicate with each other by cable or by radio.

The control processing unit 11 is a unit for controlling the respective units of the main body 3 (the input/output port 12, the communication unit 13, the acquisition unit 14, the identification information storage unit 15, the stored information generation unit 16, the image capturing information generation unit 17, the image generation unit 18, the image processing unit 19, the image storage unit 20, the report generation unit 21, the speed calculation unit 22, the abnormality determination unit 23, the display control unit 24, the display 25, and the input unit 26) in accordance with the functions of the respective units.

The input/output port 12 is an interface circuit used for communication with the infrared camera 2. The input/output port 12 receives the moving image data MD and the operating time information I1 transmitted from the input/output port 8.

The communication unit 13 is a communication interface for the gas detection device 1 to perform wired communication and wireless communication with an outside. The communication unit 13 is connectable to a network (for example, the Internet). The communication unit 13 receives a global positioning system (GPS) signal transmitted from a GPS satellite. The gas detection device 1 may include a reception unit (receiver) that receives the GPS signal separately from the communication unit 13.

The acquisition unit 14 acquires current time and a current position of the gas detection device 1 (camera device) with use of the GPS signal received by the communication unit 13. Specifically, the acquisition unit 14 acquires the current time included in the GPS signal received by the communication unit 13 and measures the current position of the gas detection device 1 with use of this GPS signal. The acquisition unit 14 acquires the current time and the current position of the gas detection device 1 at a predetermined time.

The identification information storage unit 15 stores identification information I4 of the gas detection device 1. The identification information I4 is a serial number of the gas detection device 1, for example. The identification information storage unit 15 is achieved by an HDD, a flash memory, or the like.

The stored information generation unit 16 generates stored information I2. The stored information I2 includes the current time and the current position acquired by the acquisition unit 14 during the operating term of the cooling unit 9, the operating time measured by the measurement unit 10 during the aforementioned operating term (in other words, during the same term as the aforementioned operating term), and the identification information I4 of the gas detection device 1 stored in the identification information storage unit 15. The stored information I2 is stored in a server device 200 (FIG. 2) outside the gas detection device 1. The communication unit 13 transmits the stored information I2 to the server device 200.

The image capturing information generation unit 17 generates image capturing information I3. The image capturing information I3 includes the current time and the current position acquired by the acquisition unit 14 during the aforementioned operating term (during the same term as the aforementioned operating term), the operating time measured by the measurement unit 10 during the aforementioned operating term (during the same term as the aforementioned operating term), and the identification information I4 of the gas detection device 1 stored in the identification information storage unit 15.

In a case where a time when the image capturing information generation unit 17 generates the image capturing information I3 and a time when the stored information generation unit 16 generates the stored information I2 are the same, the current time, the current position, and the operating time included in the image capturing information I3 and the current time, the current position, and the operating time included in the stored information I2 are the same. In a case where these times are different, the current time and the operating time included in the image capturing information I3 and the current time and the operating time included in the stored information I2 are different. Even in a case where these times are different, the current position included in the image capturing information I3 and the current position included in the stored information I2 are the same in a case where the gas detection device 1 does not move.

The image generation unit 18 generates an image Im associated with the image capturing information I3 based on the infrared image captured by the two-dimensional image sensor 6 during the operating term (during the same term as the operating term). The image Im may be a still image or a moving image. The image generation unit 18 may generate the image Im associated with the image capturing information I3 by performing processing for associating the infrared image captured by the two-dimensional image sensor 6 with the image capturing information I3 or may generate the image Im associated with the image capturing information I3 by performing processing for associating an image that the below-mentioned image processing unit 19 has generated by processing the infrared image with the image capturing information I3. In the embodiment, the latter will be described as an example. The current time, the current position, and the operating time included in the image capturing information I3 serve as reference for the current time, the current position, and the operating time when the infrared image is captured.

Associating the image Im with the image capturing information I3 may be adding the image capturing information I3 to the image Im or storing the image Im and the image capturing information I3 in one folder, for example. In the embodiment, an example in which the image capturing information I3 is added to the image Im will be described.

The image processing unit 19 performs image processing on the infrared image captured by the two-dimensional image sensor 6 in order for a figure illustrating leaking gas to be seen easily. A known technique can be applied to this image processing. For example, this known technique is disclosed in WO 2017/073430 A. This internationally published technique is a technique invented by the present inventor, and more specifically, disclosed is an image processing device for gas detection performing image processing on an infrared image obtained by capturing an image of a monitoring target for gas leakage at a plurality of times and including an image processing unit performing processing for eliminating from image data illustrating the infrared, image second frequency component data, the second frequency component data having lower frequency than first frequency component data indicating temperature change caused by leaked gas and indicating temperature change of a background of the monitoring target.

Also, JP 2012-58093 A, which is not a technique invented by the present inventor, discloses a gas leakage detection device detecting gas leakage in a check target area and including an infrared camera capturing an image of the check target area and an image processing unit processing an infrared image captured by the infrared camera, the image processing unit including a fluctuation extraction unit extracting dynamic fluctuation caused by gas leakage from a plurality of infrared images arranged in a time series, for example.

Figure 2:
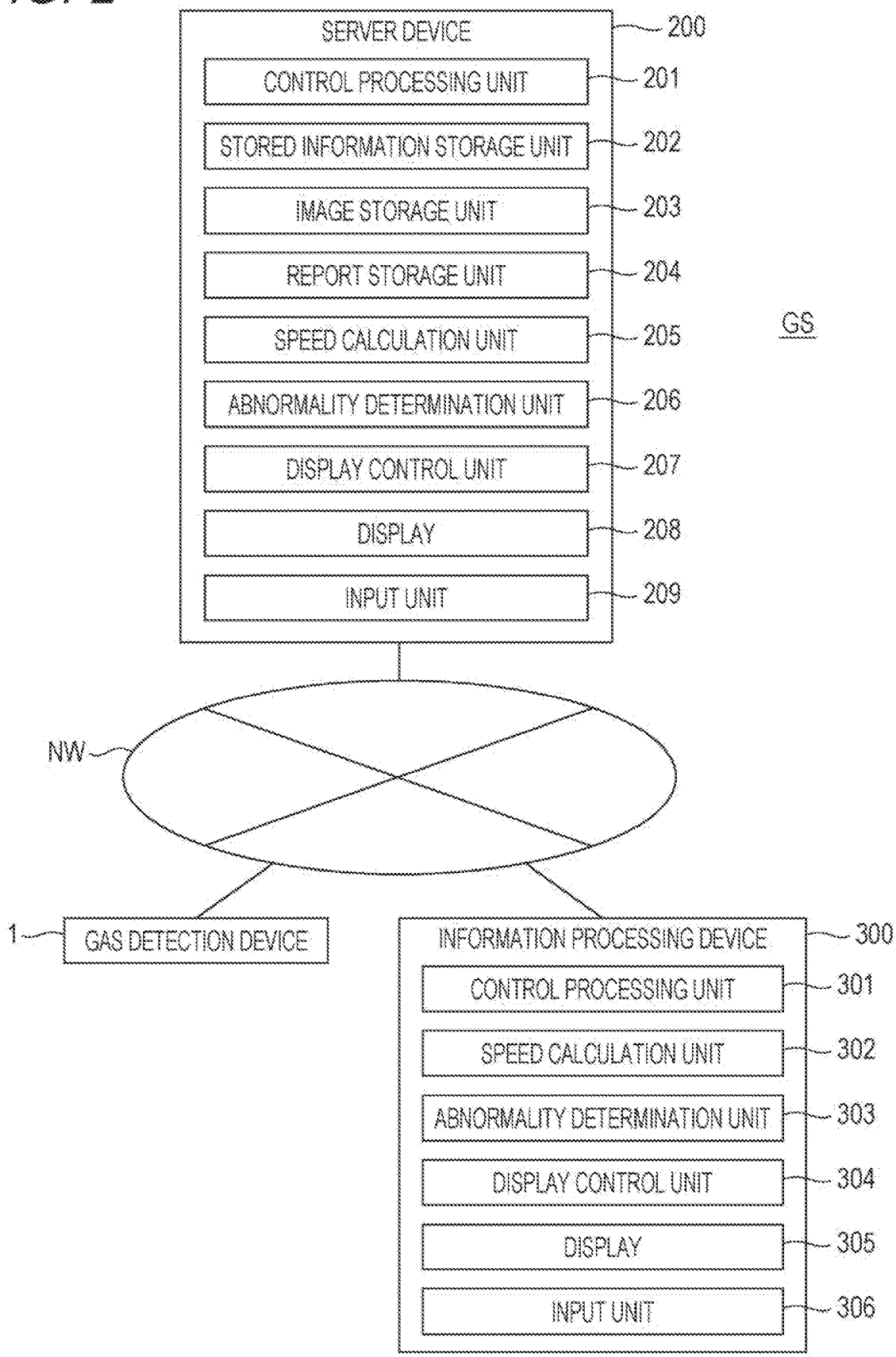
FIG. 2 is a block diagram illustrating a configuration of a gas leakage check system according to the embodiment.

The image storage unit 20 stores the image Im generated by the image generation unit 18. Image capturing information I3 about this image Im is added to (associated with) the image Im. The image Im to which the image capturing information I3 is added is also stored in the server device 200 (FIG. 2). For this reason, the communication unit 13 transmits the image Im to which the image capturing information I3 is added to the server device 200. Note that a mode is available in which the server device 200 does not store the image Im to which the image capturing information I3 is added. In this mode, the communication unit 13 does not transmit the image Im to which the image capturing information I3 is added to the server device 200.

The report generation unit 21, the speed calculation unit 22, and the abnormality determination unit 23 will be described below.

The display control unit 24 causes a moving image indicated as the moving image data MD and a moving image processed in the image processing unit 19 to be displayed on the display 25. The display control unit 24 also causes the image Im, the image capturing information I3 added to the image Im, and the stored information I2 associated with the image capturing information I3 to be displayed on the display 25. The stored information I2 associated with the image capturing information I3 is the stored information I2 including the same identification information I4 as the identification information I4 included in the image capturing information I3 and including the same current time as the current time included in the image capturing information I3 (the closest current time in a case where there is no same current time).

The display control unit 24 and the display 25 function as an output unit. The output unit outputs the image Im, the image capturing information I3 added to the image Im, and the stored information I2 associated with the image capturing information I3. A printer may be used as the output unit.

The input unit 26 is a unit for operating the gas detection device 1 and inputting data into the gas detection device 1.

Figure 1B:
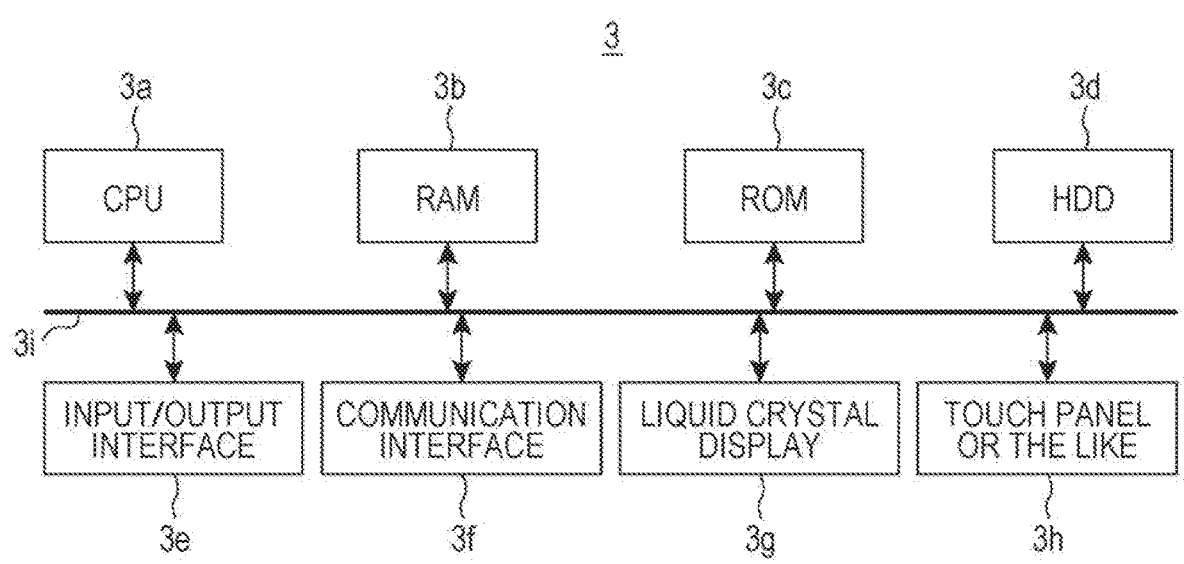
FIG. 1B is a block diagram illustrating a hardware configuration of a main body illustrated in FIG. 1A.

FIG. 1B is a block diagram illustrating a hardware configuration of the main body 3 illustrated in FIG. 1A. The main body 3 includes a CPU 3a, a RAM 3b, a ROM 3c, an HDD 3d, an input/output interface 3e, a communication interface 3f, a liquid crystal display 3g, a touch panel or the like 3h, and a bus 3i connecting these. The input/output interface 3e is hardware that fulfills the function of the input/output port 12. The communication interface 3f is hardware that fulfills the function of the communication unit 13. The liquid crystal display 3g is hardware that fulfills the function of the display 25. Instead of the liquid crystal display 3g, an organic electro luminescence display (organic EL display), a plasma display, or the like may be used. The touch panel or the like 3h is hardware that fulfills the function of the input unit 26. The touch panel or the like 3h includes a hard key.

The HDD 3d has stored therein programs for fulfilling the functional blocks of the control processing unit 11, the acquisition unit 14, the stored information generation unit 16, the image capturing information generation unit 17, the image generation unit 18, the image processing unit 19, the report generation unit 21, the speed calculation unit 22, the abnormality determination unit 23, and the display control unit 24, and various data (for example, the moving image data MD). The image processing unit 19 and the display control unit 24 will be described as examples. A program that fulfills the function of the image processing unit 19 is a processing program that acquires the moving image data MD and performs the above image processing on the moving image data MD. A program that fulfills the function of the display control unit 24 is a display control program that causes the moving image indicated as the moving image data MD to be displayed on the display 25, causes the moving image on which the above image processing has been performed by the image processing unit 19 to be displayed on the display 25, and causes the image Im, the image capturing information I3, and the stored information I2 to be displayed on the display 25.

These programs are stored in the HDD 3d in advance, and how to store these programs is not limited to this. For example, a recording medium (for example, an external recording medium such as a magnetic disk and an optical disk) having recorded therein these programs may be prepared, and the programs stored in this recording medium may be stored in the HDD 3d. Also, these programs may be stored in a server (for example, the server device 200 illustrated in FIG. 2) connected via a network to the main body 3, transmitted to the HDD 3d via the network, and stored in the HDD 3d. These programs may be stored in the ROM 3c instead of in the HDD 3d. The main body 3 may include a flash memory instead of the HDD 3d, and these programs may be stored in the flash memory.

These programs may be stored in one HDD or may be distributed and stored in a plurality of HDDs. The latter will be described with a specific example. Programs that respectively fulfill the functions of the control processing unit 11 and the display control unit 24 may be stored in a first HDD, programs that respectively fulfill the functions of the acquisition unit 14, the stored information generation unit 16, the image capturing information generation unit 17, the image generation unit 18, time speed calculation unit 22, and the abnormality determination unit 23 may be stored in a second HDD, a program that fulfills the function of the image processing unit 19 may be stored in a third HDD, and a program that fulfills the function of the report generation unit 21 may be stored in a fourth HDD. Servers including the respective HDDs may be connected via a network (for example, the Internet). Alternatively, at least one HDD may be an external HDD connected to a USB port or the like, or a network attached HDD (NAS: Network Attached Storage).

The CPU 3a is an example of a hardware processor. The CPU 3a reads these programs from the HDD 3d, expands the programs in the RAM 3b, and executes the expanded programs, to fulfill the functions of the control processing unit 11, the acquisition unit 14, the stored information generation unit 16, the image capturing information generation unit 17, the image generation unit 18, the image processing unit 19, the report generation unit 21, the speed calculation unit 22, the abnormality determination unit 23, and the display control unit 24. However, as for these functional blocks, the respective functions may partially or entirely be fulfilled by processing by means of a digital signal processor (DSP) instead of or in addition to processing by means of the CPU 3a. Also, similarly, the respective functions may partially or entirely be fulfilled by processing by means of a dedicated hardware circuit instead of or in addition to processing by means of software.

These programs are expressed using definitions of the components. The acquisition unit 14 and the acquisition program will be described as examples. The acquisition unit 14 acquires current time and a current position of the gas detection device 1 with use of a GPS signal. The acquisition program is a program for acquiring current time and a current position of the gas detection device 1 with use of a GPS signal.

Flowcharts of these programs executed by the CPU 3a are FIGS. 10 and 11 described below.

FIG. 2 is a block diagram illustrating a configuration of a gas leakage check system GS according to the embodiment. The gas leakage check system GS includes the gas detection device 1 that is connectable to a network NW (for example, the Internet), the server device 200 that is connectable to the network NW, and an information processing device 300 that is connectable to the network NW. Each of the numbers of the gas detection devices 1 and the information processing devices 300 illustrated in FIG. 2 is one and may be plural.

The server device 200 is a device that can communicate with the gas detection device 1 and the information processing device 300. The server device 200 is a computer device including as functional blocks a control processing unit 201, a stored information storage unit 202, an image storage unit 203, a report storage unit 204, a speed calculation unit 205, an abnormality determination unit 206, a display control unit 207, a display 208, and an input unit 209.

The control processing unit 201 is a unit for controlling the respective units of the server device 200 (the stored information storage unit 202, the image storage unit 203, the report storage unit 204, the speed calculation unit 205, the abnormality determination unit 206, the display control unit 207, the display 208, and the input unit 209) in accordance with the functions of the respective units. The function of the control processing unit 201 is fulfilled by hardware such as a CPU, a RAM, a ROM, and an HDD, a program for fulfilling the function of the control processing unit 201, data, and the like. The function of the control processing unit 201 may partially or entirely be fulfilled by processing by means of a DSP instead of or in addition to processing by means of the CPU. Also, the function of the control processing unit 201 may partially or entirely be fulfilled by processing by means of a dedicated hardware circuit instead of or in addition to processing by means of software. The above description can be true of the speed calculation unit 205, the abnormality determination unit 206, and the display control unit 207, and can also be true of a control processing unit 301, a speed calculation unit 302, an abnormality determination unit 303, and a display control unit 304 included in the information processing device 300.

The stored information storage unit 202 stores the stored information I2 transmitted from the gas detection device 1. In a case where there are a plurality of gas detection devices 1, the stored information storage unit 202 stores the stored information I2 for each piece of identification information of each of the gas detection devices 1. The function of the stored information storage unit 202 is fulfilled by an HDD, a flash memory, or the like. The above description is true of the image storage unit 203 and the report storage unit 204 described below.

The image storage unit 203 stores the image Im to which the image capturing information I3 is added (the image Im with which the image capturing information I3 is associated) transmitted from the gas detection device 1. In a case where there are a plurality of gas detection devices 1, the image storage unit 203 stores the image Im to which the image capturing information I3 is added for each piece of identification information of each of the gas detection devices 1. Meanwhile, in a case where the server device 200 is in a mode of not storing the image Im to which the image capturing information I3 is added, the server device 200 does not include the image storage unit 203.

The report storage unit 204, the speed calculation unit 205, and the abnormality determination unit 206 will be described below.

Similarly to the display control unit 24 in the gas detection device 1, the display control unit 207 causes the image Im, the image capturing information I3 added to the image Im, and the stored information I2 associated with the image capturing information I3 to be displayed on the display 208. The function of the display 208 is fulfilled by a liquid crystal display, for example.

The display control unit 207 and the display 208 function as a second output unit. The second output unit outputs the image Im, the image capturing information I3 added to the image Im, and the stored information I2 associated with the image capturing information I3. A printer may be used as the second output unit.

The input unit 209 is a unit for operating the server device 200 and inputting data into the server device 200. The function of the input unit 209 is fulfilled by a touch panel, a keyboard, a mouse, or the like.

The information processing device 300 is a device that can communicate with the gas detection device 1 and the server device 200. The information processing device 300 is a computer device including as functional blocks the control processing unit 301, the speed calculation unit 302, the abnormality determination unit 303, the display control unit 304, a display 305, and an input unit 306. Specifically, the information processing device 300 is a personal computer, a smartphone, a tablet terminal, or the like.

The control processing unit 301 is a unit for controlling the respective units of the information processing device 300 (the speed calculation unit 302, the abnormality determination unit 303, the display control unit 304, the display 305, and the input unit 306) in accordance with the functions of the respective units.

The speed calculation unit 302 and the abnormality determination unit 303 will be described below.

Similarly to the display control unit 24 in the gas detection device 1, the display control unit 304 causes the image Im, the image capturing information I3 added to the image Im, and the stored information I2 associated with the image capturing information I3 to be displayed on the display 305. The function of the display 305 is fulfilled by a liquid crystal display, for example.

The display control unit 304 and the display 305 function as a third output unit. The third output unit outputs the image Im, the image capturing information I3 added to the image Im, and the stored information I2 associated with the image capturing information I3. A printer may be used as the third output unit.

The input unit 306 is a unit for operating the information processing device 300 and inputting data into the information processing device 300. The function of the input unit 306 is fulfilled by a touch panel, a keyboard, a mouse, or the like.

Figure 3:
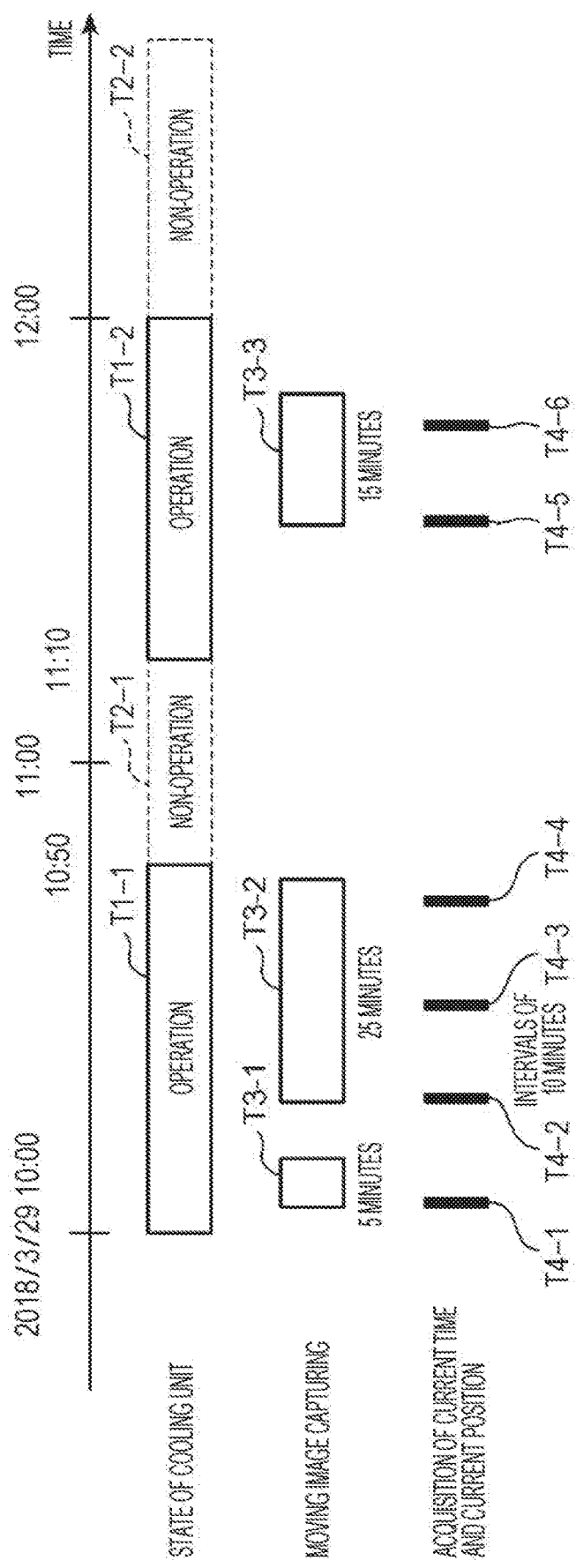
FIG. 3 is an explanatory diagram illustrating a first example of a time when stored information is generated and a time when image capturing information is generated.
Figure 4:
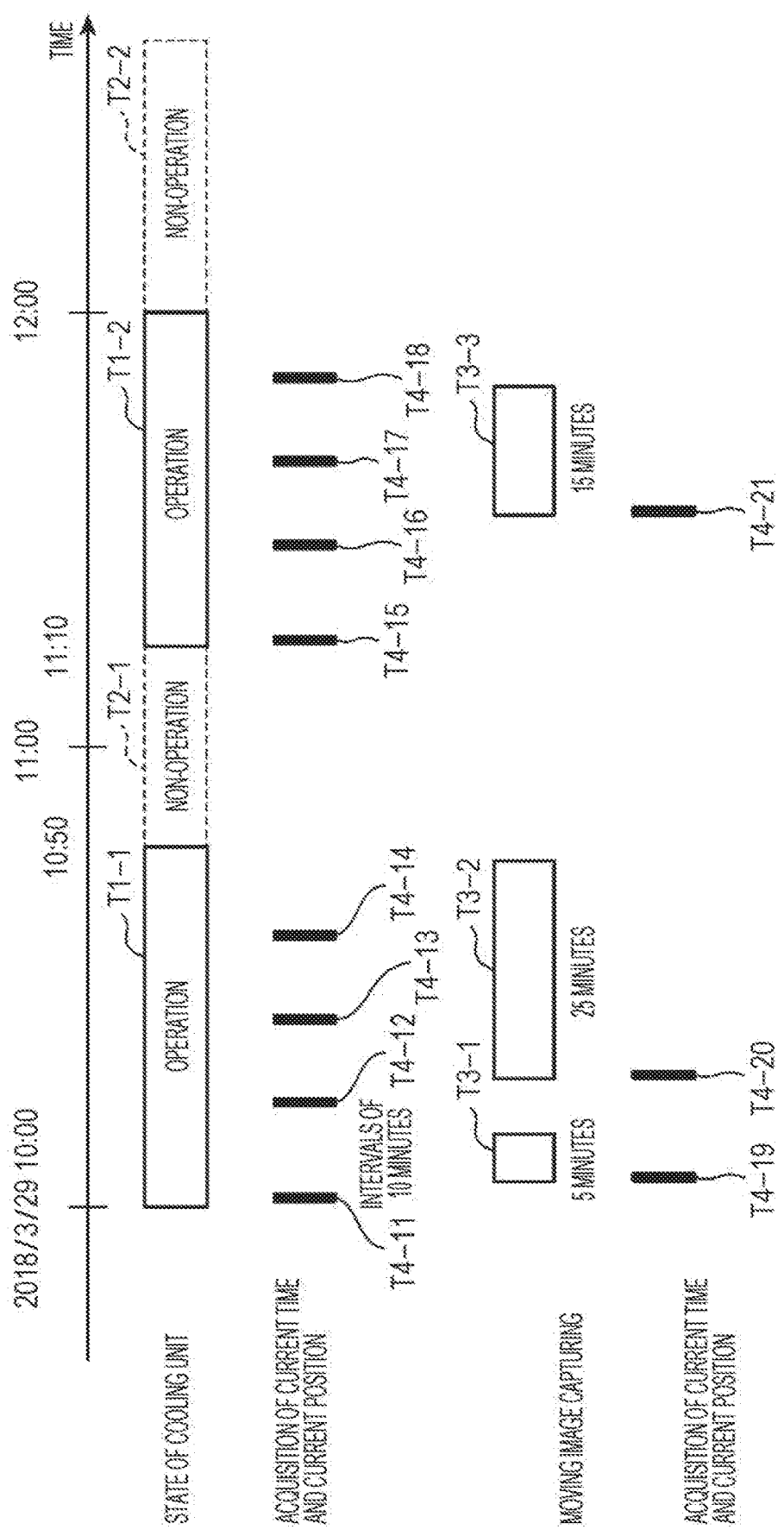
FIG. 4 is an explanatory diagram illustrating a second example of the time when the stored information is generated and the time when the image capturing information is generated.
Figure 5:
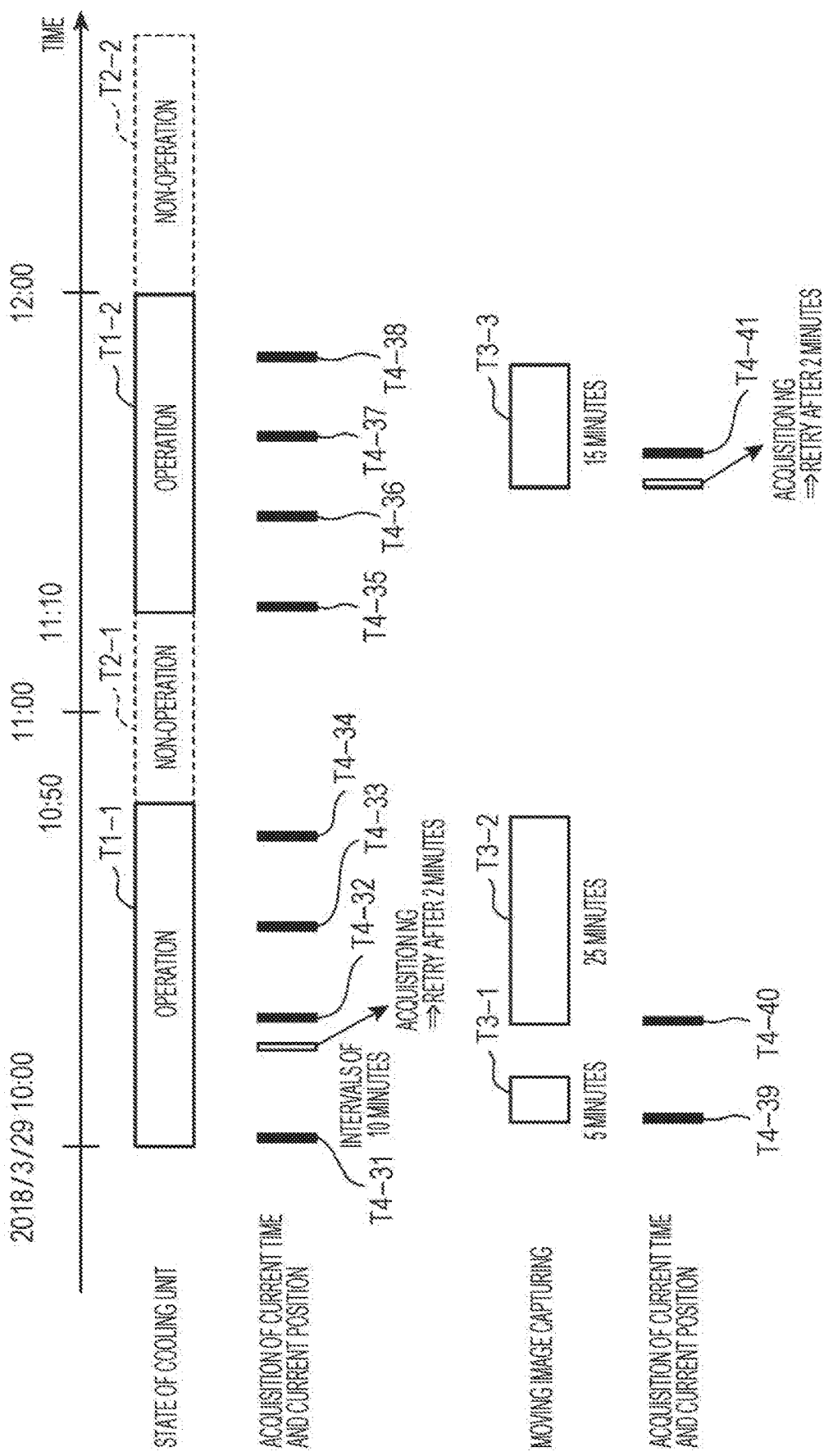
FIG. 5 is an explanatory diagram illustrating a third example of the time when the stored information is generated and the time when the image capturing information is generated.
Figure 6:
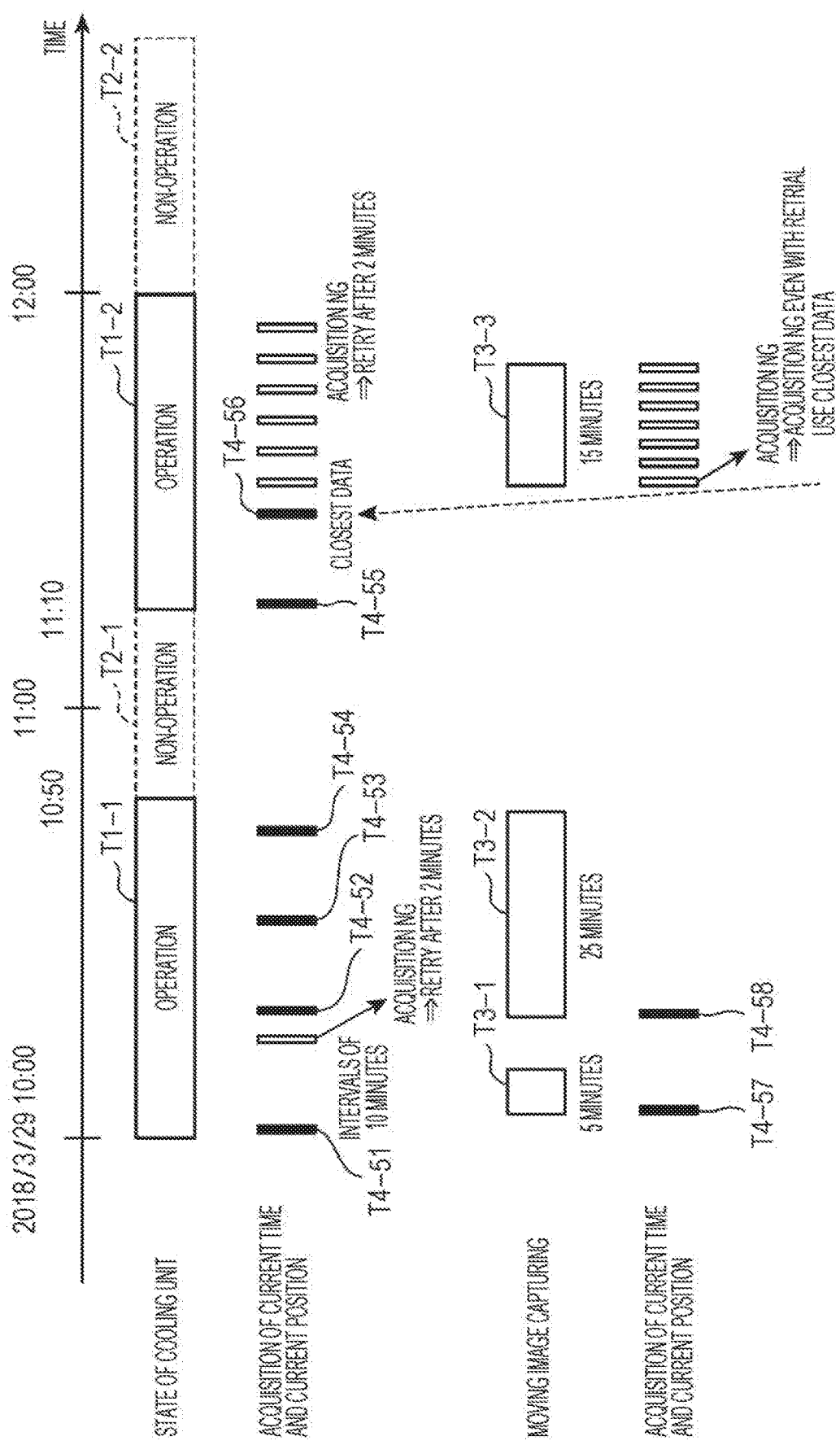
FIG. 6 is an explanatory diagram illustrating a fourth example of the time when the stored information is generated and the time when the image capturing information is generated.

There are first to fourth examples of a time when the stored information I2 is generated by the stored information generation unit 16 illustrated in FIG. 1A and a time when the image capturing information I3 is generated by the image capturing information generation unit 17 illustrated in FIG. 1A. FIG. 3 is an explanatory diagram illustrating the first example. FIG. 4 is an explanatory diagram illustrating the second example. FIG. 5 is an explanatory diagram illustrating the third example. FIG. 6 is an explanatory diagram illustrating the fourth example.

Referring to FIGS. 1A and 3 to 6, a state of the cooling unit 9, moving image capturing, and an acquisition time of current time and a current position are illustrated in chronological order. The state of the cooling unit 9 includes an operating term T1 and a non-operating term T2 of the cooling unit 9. The operating term T1 and the non-operating term T2 occur alternately. The moving image capturing is capturing of a moving image (image Im) of a monitoring target with use of the gas detection device 1. A moving image is captured once or a plurality of times during one operating term. The rectangular area in the figure indicates an image capturing term T3. An acquisition time T4 of current time and a current position is a time when the acquisition unit 14 acquires current time and a current position with use of a GPS signal. Note that operating time of the cooling unit 9 included in the stored information I2 and the image capturing information I3 is a value measured by the measurement unit 10 at the acquisition time T4. The measurement unit 10 transmits the operating time information I1 indicating this value to the main body 3. As a result, the stored information generation unit 16 and the image capturing information generation unit 17 can acquire the operating time.

Referring to FIGS. 1A and 3, in the first example, the stored information I2 and the image capturing information I3 are generated at the acquisition time T4 when the current time and the current position are acquired during the moving image capturing term T3. A detailed description will be provided. The acquisition unit 14 acquires the current time and the current position and acquires the operating time from the measurement unit 10 at the start of capturing a moving image. When the moving image capturing term exceeds ten minutes, the acquisition unit 14 acquires the current time and the current position and acquires the operating time from the measurement unit 10 at intervals of ten minutes. Ten minutes is an example, and the interval is not limited to this.

The stored information generation unit 16 generates the stored information I2 each time the acquisition unit 14 acquires the current time, the current position, and the operating time during the moving image capturing term T3. Here, the stored information I2 is generated at the acquisition time T4-1 included in the five-minute image capturing term T3-1, the stored information I2 is generated at each of the acquisition times T4-2, T4-3, and T4-4 included in the twenty-five-minute image capturing term T3-2, and the stored information I2 is generated at each of the acquisition times T4-5 and T4-6 included in the fifteen-minute image capturing term. T3-3.

The image capturing information generation unit 17 generates the image capturing information I3 to be added to the moving image at the time when the current time, the current position, and the operating time are acquired at the start of capturing the moving image. Here, the image capturing information I3 is generated at the acquisition time T4-1 included in the five-minute image capturing term T3-1, the image capturing information I3 is generated at the acquisition time T4-2 included in the twenty-five-minute image capturing term T3-2, and the image capturing information I3 is generated at the acquisition time T4-5 included in the fifteen-minute image capturing term T3-3.

FIG. 7 is an explanatory diagram illustrating an example of a template of the stored information I2 used in the first example. FIG. 8 is an explanatory diagram illustrating an example of a template of the image capturing information I3 used in the first example. Referring to FIGS. 7 and 8, in the first example, the items forming the stored information I2 and the items forming the image capturing information I3 are the same. An item 401 indicates current time, and a column 401a indicates acquired current time. An item 402 indicates a current position, and columns 402a and 402b indicate an acquired current position. The current position is indicated by latitude and longitude.

An item 403 indicates operating time of the cooling unit 9, and a column 403a indicates acquired operating time. An item 404 indicates the number of repairs/replacements of the cooling unit 9, and a column 404a indicates the acquired number of repairs and replacements. The number of repairs/replacements is recorded in the measurement unit 10 illustrated in FIG. 1A. Each time the cooling unit 9 is repaired or replaced, the measurement unit 10 resets the operating time to zero and counts the number of repairs/replacements. The measurement unit 10 includes the number of repairs/replacements in the operating time information I1. As a result, the stored information generation unit 16 and the image capturing information generation unit 17 can acquire the number of repairs/replacements. There is also a type in which the measurement unit 10 does not count the number of repairs/replacements of the cooling unit 9. In this type, the measurement unit 10 does not reset the operating time even when the cooling unit 9 is repaired or replaced and starts measuring the operating time in a state of the operating time before the replacement. In the case of this type, the item 404 and the column 404a for the number of repairs/replacements are not needed.

An item 405 indicates identification information 14, and a column 405a indicates acquired identification information 14. The stored information generation unit 16 and the image capturing information generation unit 17 acquire the identification information 14 by reading the identification information 14 stored in advance in the identification information storage unit 15.

Referring to FIGS. 1A and 4, in the second example, the stored information I2 is generated at the acquisition time T4 when the current time and the current position are acquired during the operating term T1 of the cooling unit 9, and the image capturing information I3 is generated at the acquisition time T4 when the current time and the current position are acquired at the start of capturing a moving image. A detailed description will be provided. The acquisition unit 14 acquires the current time and the current position and acquires the operating time from the measurement unit 10 at the start of operating the cooling unit 9. Subsequently, the acquisition unit 14 acquires the current time and the current position and acquires the operating time from the measurement unit 10 at intervals of ten minutes during the operating term of the cooling unit 9. Ten minutes is an example, and the interval is not limited to this. The stored information generation unit 16 generates the stored information I2 each time the acquisition unit 14 acquires the current time, the current position, and the operating time during the operating term T1 of the cooling unit 9. Here, the stored information I2 is generated at each of the acquisition times T4-11 to T4-14 included in the operating term T1-1, and the stored information I2 is generated at each of the acquisition times T4-15 to T4-18 included in the operating term T1-2.

The acquisition unit 14 acquires the current time and the current position and acquires the operating time from the measurement unit 10 at the start of capturing a moving image. The image capturing information generation unit 17 generates image capturing information I3 to be added to this moving image at this time. Here, the image capturing information I3 is generated at the acquisition time T4-19 included in the five-minute image capturing term T3-1, the image capturing information I3 is generated at the acquisition time T4-20 included in the twenty-five-minute image capturing term T3-2, and the image capturing information I3 is generated at the acquisition time T4-21 included in the fifteen-minute image capturing term T3-3.

The template of the stored information I2 used in the second example is the same as the template of the stored information I2 used in the first example illustrated in FIG. 7. The template of the image capturing information I3 used in the second example is the same as the template of the image capturing information I3 used in the first example illustrated in FIG. 8. Note that, similarly to the first example, the stored information I2 and the image capturing information I3 include the number of repairs/replacements of the cooling unit 9.

In the second example, the stored information I2 and the image capturing information I3 are generated at different acquisition times T4. For this reason, the current time included in the image capturing information I3 does not correspond to the current time included in the stored information I2, and the operating time included in the image capturing information I3 does not correspond to the operating time included in the stored information I2. However, some of the acquisition times T4-11 to T4-18 when the stored information I2 is generated are close to the acquisition times T4-19 to T4-21 when the image capturing information I3 is generated (for example, the acquisition time T4-19 is close to the acquisition time T4-11). Therefore, it is possible to detect incorrectness in check data.

Referring to FIGS. 1A and 5, the third example is a modification of the second example illustrated in FIG. 4. When the communication unit 13 fails to receive a GPS signal, the communication unit 13 tries to receive the GPS signal after a predetermined period of time has elapsed (for example, after two minutes have elapsed). The template of the stored information I2 used in the third example is the same as the template of the stored information I2 used in the first example illustrated in FIG. 7. The template of the image capturing information I3 used in the third example is the same as the template of the image capturing information I3 used in the first example illustrated in FIG. 8.

Referring to FIGS. 1A and 6, the fourth example is a modification of the third example illustrated in FIG. 5. When the communication unit 13 cannot receive a GPS signal during the image capturing term T3, the image capturing information generation unit 17 generates the image capturing information I3 based on the stored information I2 generated at the closest time (closest data). Here, since the communication unit 13 has not succeeded in receiving the GPS signal during the fifteen-minute image capturing term T3-3, the image capturing information generation unit 17 generates the image capturing information I3 based on the stored information I2 (closest data) generated with use of the current time and the current position acquired at the acquisition time T4-56.

The template of the stored information I2 used in the fourth example is the same as the template of the stored information I2 used in the first example illustrated in FIG. 7. The template of the image capturing information I3 used in the fourth example is different from the template of the image capturing information I3 used in the first example illustrated in FIG. 8. FIG. 9 is an explanatory diagram illustrating an example of a template of the image capturing information I3 used in the fourth example. An item 406 and a column 406a are added. The item 406 indicates elapsed time, and the column 406a indicates elapsed time calculated by the image capturing information generation unit 17. The elapsed time is time that has elapsed from the acquisition time T4 (here, the acquisition time T4-56) of the current time and the current position used to generate the closest stored information I2. The end point of the elapsed time is the start of the image capturing term T3 (here, the image capturing tem T3-3) in which the GPS signal has not been received. By looking at the elapsed time, the difference between the image capturing term T3 in which the GPS signal has not been received and the current time is found.

When the moving image capturing term T3 is short, the communication unit 13 may not be able to receive the GPS signal during this image capturing term T3. The current time and the current position included in the image capturing information I3 act as one of the clues to detection of incorrectness in check data. Therefore, when the communication unit 13 cannot receive the GPS signal during the image capturing term T3, the image capturing information generation unit 17 includes in the image capturing information I3 the current time and the current position included in the stored information I2 (closest data) generated at the closest time. As a result, the image capturing information I3 can always include the current time and the current position. Consequently, in a case where the image capturing information I3 does not include the current time and the current position, a third party who confirms the check data can determine that the check data is incorrect.

Referring to FIG. 2, the gas detection device 1 generates the stored information I2 and uploads the stored information I2 to the server device 200. FIG. 10 is a flowchart describing this operation. The time when the stored information I2 is generated is as in the second example illustrated in FIG. 4. In the second example, the stored information I2 is generated irrespective of capturing of the moving image by means of the gas detection device 1.

Referring to FIGS. 1A, 2, and 10, when the checker turns on the power of the gas detection device 1, the cooling unit 9 starts operation, and the control processing unit 11 takes control so that the communication unit 13 may receive a GPS signal at intervals of ten minutes (step S1). When the communication unit 13 receives the GPS signal, the stored information generation unit 16 acquires the current time, the current position, the operating time, the number of repairs/replacements, and the identification information I4 (step S2). The stored information generation unit 16 uses the acquired information (the current time, the current position, the operating time, the number of repairs/replacements, and the identification information I4) to generate the stored information I2 (step S3). Each time the reception unit receives a GPS signal, the processing in step S2 and the processing in step S3 are repeated (step S4).

When the communication unit 13 is ready for communication with the server device 200 with use of the network NW, the control processing unit 11 causes the communication unit 13 to transmit the stored information I2 generated by the stored information generation unit 16 at the present moment (step S5). The server device 200 receives the stored information I2 transmitted via the network NW, and the control processing unit 201 causes the received stored information I2 to be stored in the stored information storage unit 202.

In step S5, the communication unit 13 transmits the plurality of pieces of stored information I2 to the server device 200 at once, and the present invention is not limited to this. The communication unit 13 may transmit the stored information I2 to the server device 200 each time the stored information I2 is generated.

An operation of the gas detection device 1 illustrated in FIG. 1A regarding image capturing will be described. FIG. 11 is a flowchart describing this operation. The image Im is a moving image. The time when the image capturing information I3 to be added to the image Im (the image capturing information I3 associated with the image Im) is generated is as in the second example illustrated in FIG. 4.

Referring to FIGS. 1A and 11, during the operating term of the cooling unit 9, the checker operates a recording start key included in the input unit 26. As a result, the infrared camera 2 starts capturing an infrared moving image (step S11). The input/output port 8 transmits the moving image data MD of this moving image to the input/output port 12. The image processing unit 19 performs the above-mentioned image processing on the transmitted moving image data MD.

The control processing unit 11 takes control so that the communication unit 13 may receive a GPS signal when the infrared camera 2 starts capturing a moving image (step S12). When the communication unit 13 receives the GPS signal, the image capturing information generation unit 17 acquires the current time, the current position, the operating time, the number of repairs/replacements, and the identification information 14 (step S13). The image capturing information generation unit 17 uses the acquired information (the current time, the current position, the operating time, the number of repairs/replacements, and the identification information 14) to generate the image capturing information I3 (step S14).

The checker operates a recording stop key included in the input unit 26. As a result, the infrared camera 2 ends capturing of the infrared moving image (step S15). The image generation unit 18 generates a moving image file for this image capturing term when capturing of the moving image is ended. The moving image (image Im) included in the moving image file is a moving image that has been image-processed by the image processing unit 19. Note that, in a case where no image processing is performed, the moving image is the infrared moving image.

Text can be embedded in metadata included in the moving image file (this is true of a still image file). The image generation unit 18 performs processing for embedding the image capturing information I3 generated in step S14 in the metadata as text. As a result, the moving image (image Im) to which the image capturing information I3 is added is generated (step S16). The image generation unit 18 preferably encrypts the image capturing information I3 before embedding the image capturing information I3 in the metadata. The image generation unit 18 causes the moving image (image Im) to which the image capturing information I3 is added to be stored in the image storage unit 20 (step S17).

When the communication unit 13 is ready for communication with the server device 200 with use of the network NW, the control processing unit 11 causes the communication unit 13 to transmit the moving image to which the image capturing information I3 is added generated in step S16 (step S18). The server device 200 receives the moving image to which the image capturing information I3 is added transmitted via the network NW, and the control processing unit 201 causes the moving image (image Im) to which the image capturing information 13 is added to be stored in the image storage unit 203.

Viewing of the stored information I2 stored in the stored information storage unit 202 illustrated in FIG. 2 will be described. The stored information storage unit 202 stores many pieces of stored information I2 collected from the gas detection device 1. The display control unit 207 can convert the many pieces of stored information stored in the stored information storage unit 202 into a list table TB and display the list table TB on the display 208. FIG. 12 is an explanatory diagram illustrating a part of an example of the list table TB. FIG. 12 is a part of the list table TB for the gas detection device 1 specified by the identification information I4 "00000231". Items in the list table TB are items of the stored information I2 illustrated in FIG. 7 except the item 405 for the identification information I4. That is, the list table TB includes respective items of the operating time of the cooling unit 9, the number of repairs/replacements of the cooling unit 9, the current time, and the current position.

Referring to FIGS. 2 and 12, the third party who confirms the check data can confirm the usage state of the gas detection device 1 specified by the identification information I4 by looking at the list table TB. The check data includes the image Im, the image capturing place for the image Im, the image capturing date and time, and the like. The image capturing place is the current position included in the image capturing information I3. The image capturing date and time is the current time included in the image capturing information I3. Provided is the stored information I2 including 15:43:52 on Mar. 20, 2018 as the current time, and provided subsequently is the stored information I2 including 8:10:32 on Mar. 23, 2018 as the current time. Therefore, it is apparent that the gas detection device 1 is not used during this term.

When the column showing the item of the current position is clicked, the display control unit 207 may cause a map indicating the current position shown in the column to be displayed on the display 208.

The display control unit 207 can cause the image Im stored in the image storage unit 203 and the image capturing information I3 added to the image Im to be displayed on the display 208. The third party who confirms the chock data can determine whether or not the image Im (moving image) captured by the gas detection device 1 specified by the identification information I4 is actually captured at the time and at the position by comparing the list table TB with the image capturing information I3 added to the image Im. For example, in a case where the current time included in the image capturing information I3 is in the time zone on Mar. 21, 2018, the gas detection device 1 is not used on this day according to the list table TB. Therefore, the check data including this image Im is regarded as being incorrect.

Also, for example, suppose that the current time included in the image capturing information I3 is in the time zone of 8:00 on Mar. 23, 2018. Information corresponding to this time zone in the list table TB is the stored information I2 including 8:10:32 on Mar. 23, 2018 as the current time. However, in a case where the current position included in the image capturing information I3 and the current position included in the stored information I2 are greatly apart from each other (for example, 200 km), the check data including the image Im is regarded as being incorrect.

Since the image capturing information I3 is always added to the image Im, the check data including the image Ira to which the image capturing information I3 is not added is regarded as being incorrect.

As described above, according to the embodiment, since the third party who confirms the check data can detect incorrectness of the check data including the image Im, the reliability of the check data including the image Im can be improved. Also, the third party can confirm the use state of the gas detection device 1 by looking at the list table TB.

Since the stored information I2 and the image capturing information I3 include the operating time of the cooling unit 9, it is possible to confirm the operating time of the cooling unit 9 even in a case where the gas detection device 1 is not at hand.

The third party who confirms the check data can also look at the list table TB, the image Im, and the image capturing information I3 on a device other than the server device 200 (the information processing device 300 and the gas detection device 1). In a case of the information processing device 300, the server device 200 transmits the stored information I2 stored in the stored information storage unit 202 and the image Im and the image capturing information I3 stored in the image storage unit 203 via the network NW to the information processing device 300. The display control unit 304 converts the transmitted stored information I2 into the list table TB, displays the list table TB on the display 305, and displays the transmitted image Im and image capturing information I3 on the display 305.

In a case of the gas detection device 1, the server device 200 transmits the stored information I2 stored in the stored information storage unit 202 via the network NW to the gas detection device 1. The display control unit 24 illustrated in FIG. 1A converts the transmitted stored information I2 into the list table TB, displays the list table TB on the display 25, and displays the image Im and image capturing information I3 stored in the image storage unit 20 on the display 25.

Figure 13:
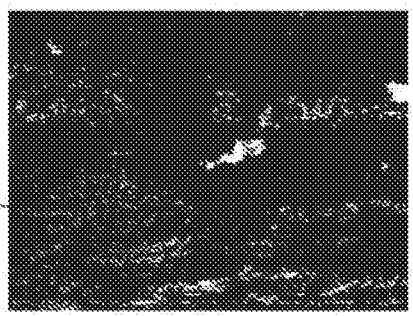
FIG. 13 is an explanatory diagram illustrating an example of gas check report data.

The report generation unit 21 illustrated in FIG. 1A will be described. The report generation unit 21 generates gas check report data RP. The checker may check the monitoring target for gas leakage for presence or absence of gas leakage, and the gas check report data RP may be prepared that includes evidence visually illustrating the presence or absence of gas leakage. The report generation unit 21 generates the gas check report data RP including the image Im. FIG. 13 is an explanatory diagram illustrating an example of the gas check report data RP. The gas check report data RP includes predetermined item columns (for example, a date/time column, a place column, a checker column, a weather column, and a wind speed column) and has the image Im attached thereto. Also, the gas check report data RP is linked to comparison information I5 that allows the image capturing information I3 and the stored information I2 to be compared. Details of the comparison information I5 will be described below.

Referring to FIGS. 1A and 13, the checker operates the input unit 26 to select the image Im to be attached to the gas check report data RP. In a case where the gas check report data RP is electronic data, the image Im may be a moving image or a still image. In a case where the gas check report data RP is paper, the image Im is a still image. In a case of the still image, the checker operates the input unit 26 to select a still image to be attached to the gas check report data RP from among the moving image frames.

When the checker operates the input unit 26 and inputs a command to generate a report, the report generation unit 21 generates the gas check report data RP. A detailed description will be provided.

When the report generation command is input, the acquisition unit 14 acquires the current time and the current position with use of the GPS signal, inputs the acquired current time into the date/time column of the gas check report data RP, and inputs the acquired current position into the place column of the gas check report data RP.

The gas detection device 1 has a login function. The report generation unit 21 inputs the name of the logged-in user in the checker column when the report generation command is input.

The gas detection device 1 has a function of acquiring weather information at the current position. When the report generation command is input, the gas detection device 1 uses the function to acquire the weather information at the current position. The report generation unit 21 inputs this weather information into the weather column.

The gas detection device 1 is connectable to an anemometer (not illustrated). The checker connects the anemometer to the gas detection device 1. The report generation unit 21 inputs a wind speed value measured with use of the anemometer into the wind speed column.

The report generation unit 21 attaches the image Im selected by the checker to a predetermined position of the gas check report data RP.

The report generation unit 21 generates the gas check report data RP in the above manner. The display control unit 24 causes the gas check report data RP to be displayed on the display 25. The checker can confirm the contents of the gas check report data RP by looking at the display 25.

Referring to FIGS. 1A, 2, and 13, in a case where the checker submits the gas check report data RP in the form of electronic data, the checker operates the input unit 26 to input a command to transmit the gas check report data RP. The control processing unit 11 causes the communication unit 13 to transmit the gas check report data RP with the server device 200 as a destination. The gas check report data. RP is transmitted via the network NW to the server device 200. The control processing unit 201 causes the transmitted gas check report data. RP to be stored in the report storage unit 204.

A confirming person of the gas check report data RP (for example, the third party who confirms the check data) operates the input unit 209 to input a command to display the gas check report data RP. As a result, the display control unit 207 causes the gas check report data RP stored in the report storage unit 204 to be displayed on the display 208.

Figure 14:
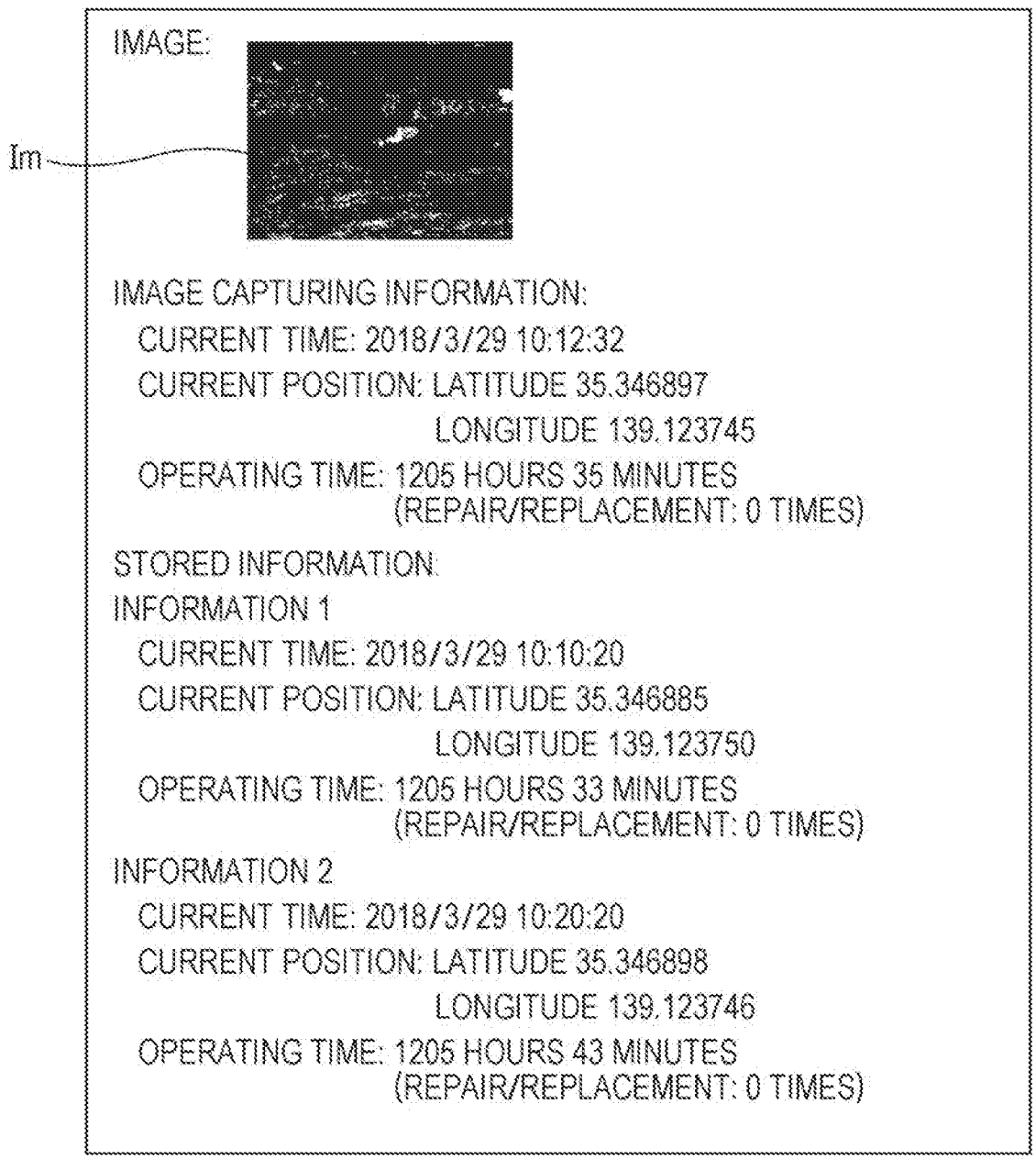
FIG. 14 is an explanatory diagram illustrating an example of comparison information.

When the confirming person of the gas check report data RP operates the input unit 209 and clicks the character string "comparison information", the display control unit 207 generates the comparison information I5 and causes the generated comparison information I5 to be displayed on the display 208. FIG. 14 is an explanatory diagram illustrating an example of the comparison information I5. The comparison information I5 includes the image Im attached to the gas check report data RP, the image capturing information I3 of the image Im, and a plurality of pieces of stored information I2 including the current time that is the same as or close to the current time included in the image capturing information I3. The confirming person of the gas check report data RP can determine whether or not the check data including the image Im is incorrect by looking at the comparison information I5. Although the example in which the comparison information I5 is displayed on the display 208 of the server device 200 has been described, the comparison information I5 may be displayed on the display 25 of the gas detection device 1 or on the display 305 of the information processing device 300.

In a case where the gas check report data RP is in a paper form, the gas check report data RP includes information (for example, a URL) indicating a destination to be linked to the comparison information I5. This information may be displayed as characters or symbols, or as a two-dimensional code.

The speed calculation unit 205 (second calculation unit) and the abnormality determination unit 206 (second determination unit) illustrated in FIG. 2 will be described. It is determined by these units whether or not the moving speed of the gas detection device 1 is abnormal. In a case where the moving speed of the gas detection device 1 is high (for example, 100 km/h), it is considered that the gas detection device 1 is not in use (the cooling unit 9 is not in operation) but is moving. In a case where the moving speed of the gas detection device 1 is high while the gas detection device 1 is in use (for example, in a case Where the operating time included in the image capturing information I3 and the operating time included in the stored information I2 are close, it is estimated that the gas detection device 1 is in use), the confirming person of the gas check report data RP (the third party who confirms the check data) can determine that the check data is incorrect.

Figure 15:
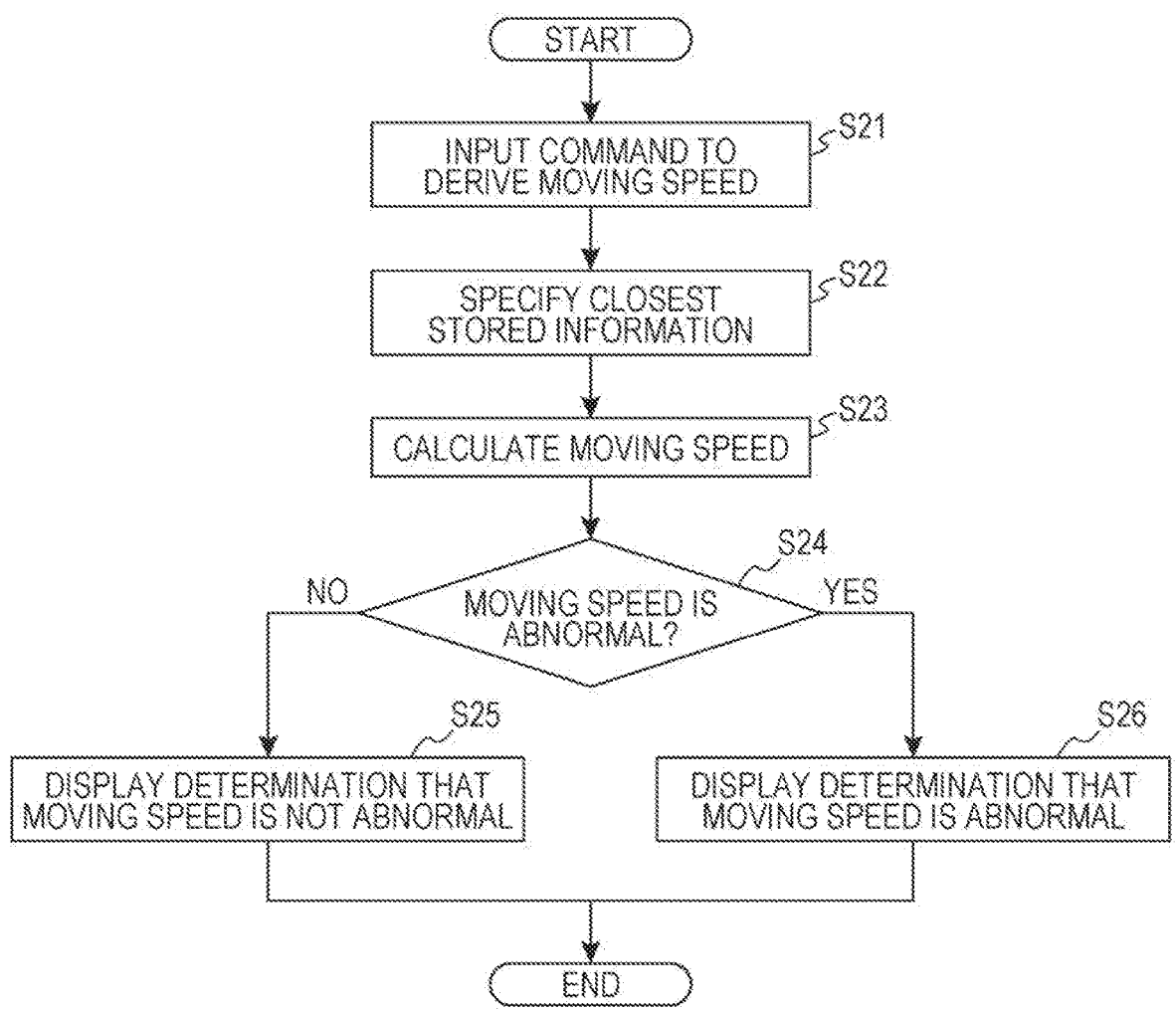
FIG. 15 is a flowchart illustrating processing for determining whether or not the moving speed of the gas detection device is abnormal.

FIG. 15 is a flowchart illustrating processing for determining whether or not the roving speed of the gas detection device 1 is abnormal. Referring to FIGS. 2, 14, and 15, the confirming person of the gas check report data RP operates the input unit 209 in a state in which the comparison information I5 is displayed on the display 208 and inputs a command to derive the moving speed (step S21).

The speed calculation unit 205 specifies the stored information I2 including the current time closest to the current time included in the image capturing information I3 from among pieces of stored information I2 including the same identification information I4 as the identification information I4 included in the image capturing information I3 (step S22). The closest current time is used because it can be estimated by this that the gas detection device 1 is in use. The image capturing information I3 is the image capturing information I3 illustrated in FIG. 14. The stored information I2 including 1010:20 on Mar. 29, 2018 as the current time is specified.

The speed calculation unit 205 calculates the moving speed of the gas detection device 1 with use of the current time and the current position included in the stored information I2 specified in step S22 and the current time and the current position included in the image capturing information I3 (step S23).

The abnormality determination unit 206 determines whether or not the moving speed calculated in step S23 is abnormal (step S24). For example, the abnormality determination unit 206 determines that the moving speed is abnormal in a case where the moving speed exceeds a predetermined threshold value and determines that the moving speed is not abnormal in a case where the moving speed is equal to or lower than the predetermined threshold value.

In a case where the abnormality determination unit 206 determines that the moving speed is not abnormal (No in step S24), the display control unit 207 causes the determination that the moving speed is not abnormal to be displayed on the display 208 (step S25). In a case where the abnormality determination unit 206 determines that the moving speed is abnormal (Yes in step S24), the display control unit 207 causes the determination that the moving speed is abnormal to be displayed on the display 208 (step S26).

A mode in which the abnormality determination unit 206 is not provided is also available. In the case of this mode, the display control unit 207 causes the moving speed calculated in step S23 to be displayed on the display 208. The confirming person of the gas check report data RP looks at the moving speed displayed on the display 208 and determines whether or not the moving speed is abnormal.

The calculation of the moving speed of the gas detection device 1 and the abnormality determination can also be executed by a device other than the server device 200 (the information processing device 300 or the gas detection device 1). In the case of the information processing device 300, the speed calculation unit 302 (third calculation unit) has the same function as the speed calculation unit 205, and the abnormality determination unit 303 (third determination unit) has the same function as the abnormality determination unit 206. In the case of the gas detection device 1, the speed calculation unit 22 (calculation unit) has the same function as the speed calculation unit 205, and the abnormality determination unit 23 (determination unit) has the same function as the abnormality determination unit 206.

Wrap-Up of Embodiments

A camera device according to a first aspect is a camera device for use in gas detection based on an infrared image and includes an imaging element that captures the infrared image, a cooling unit that cools the imaging element, a measurement unit that measures operating time of the cooling unit, a reception unit that receives a GPS signal, an acquisition unit that acquires current time and a current position of the camera device with use of the GPS signal, a storage unit that stores identification information of the camera device, a first generation unit that generates stored information stored in a server device, the stored information including the current time and the current position acquired by the acquisition unit during an operating term of the cooling unit, the operating time measured by the measurement unit during the operating term, and the identification information stored in the storage unit, a communication unit that transmits the stored information to the server device, a second generation unit that generates image capturing information associated with an image, the image capturing information including the current time and the current position acquired by the acquisition unit during the operating term, the operating time measured by the measurement unit during the operating term, and the identification information stored in the storage unit, and a third generation unit that generates the image associated with the image capturing information based on the infrared image captured by the imaging element during the operating term.

In a case where start and stop of operation of the cooling unit are interlocked with turning on and off the power of the camera device, an on-term of the power of the camera device is an operating term of the cooling unit. In a case where a switch that operates the cooling unit is provided in the camera device separately from the power switch of the camera device, an on-term of the switch that operates the cooling unit is the operating term of the cooling unit.

A time when the first generation unit acquires the current time, the current position, the operating time, and the identification information to be included in the stored information and a time when the second generation unit acquires the current time, the current position, the operating time, and the identification information to be included in the image capturing information may be the same or different. There are various examples as described in the embodiments.

An infrared camera for gas detection is classified into a type that cools the imaging element and a type that does not cool the imaging element. The cooling type can achieve more highly sensitive image capturing than the non-cooling type. The camera device according to the first aspect of the present invention is assumed to be the cooling type. The cooling type includes a cooling unit that cools the imaging element. Since the cooling performance decreases further as the operating time of the cooling unit is longer, the cooling unit needs to be replaced when the operating time reaches a predetermined time (for example, 15,000 hours). Therefore, the measurement unit measures the operating time of the cooling unit.

Since it is necessary to accurately check that the operating time has reached the above predetermined time, the operating time measured by the measurement unit cannot be rewritten by the checker (the image capturing person or the user of the camera device). Since the stored information is stored in the server device, it is difficult for the checker to rewrite the stored information. Therefore, the operating time included in the stored information is extremely reliable.

Since the operating time is included in the image capturing information and the stored information, the third party who confirms the check data (an image, image capturing time of this image, an image capturing position, and the like) can use the operating time as a clue and find incorrectness (for example, using last year's check data as this year's check data). Therefore, the camera device according to the first aspect can improve the reliability of the check data.

In the above configuration, further provided is a fourth generation unit that generates gas check report data including the image.

The checker may check a monitoring target for gas leakage for presence or absence of gas leakage, and gas check report data may be prepared that includes evidence visually illustrating the presence or absence of gas leakage. With this configuration, the image generated based on the infrared image captured by the checker with use of the camera device can be included in the gas check report data.

In the above configuration, further provided is an image processing unit that performs image processing on the infrared image captured by the imaging element in order for a figure illustrating leaking gas to be seen easily to generate the image.

In an infrared image, a figure illustrating leaking gas (gas figure) may be difficult to see. The image processing unit performs image processing on the infrared image in order for the figure illustrating leaking gas to be seen easily. With this configuration, the image that has been subjected to this image processing can be used as an image for check data (an image associated with image capturing information). Also, with this configuration, the image that has been subjected to this image processing can be included in the gas check report data.

In the above configuration, the second generation unit generates the image capturing information including the current time and the current position acquired with use of the GPS signal received by the reception unit during an image capturing term which is included in the operating term and in which the imaging element is capturing the infrared image, the operating time measured by the measurement unit during the image capturing term, and the identification information stored in the storage unit, and in a case where the reception unit cannot receive the GPS signal during the image capturing term, the second generation unit includes in the image capturing information the current time and the current position included in the stored information generated at a closest time.

The acquisition unit acquires the current time and the current position to be included in the image capturing information with use of the GPS signal received during the image capturing term. The image capturing term of the infrared image is within the operating term of the cooling unit and is shorter than the operating term. For this reason, the reception unit may not be able to receive the GPS signal during the image capturing term (for example, the reception unit fails to receive the GPS signal during the fifteen-minute moving image capturing term). The current time and the current position included in the image capturing information act as one of the clues to detection of incorrectness in check data. Therefore, when the reception unit cannot receive the GPS signal during the image capturing term, the second generation unit includes in the image capturing information the current time and the current position included in the stored information generated at the closest time. As a result, the image capturing information can always include the current time and the current position. Consequently, in a case where the image capturing information does not include the current time and the current position, the third party who confirms the check data can determine that the check data is incorrect.

In the above configuration, further provided is an output unit that outputs the image associated with the image capturing information, the image capturing information, and the stored information.

With this configuration, the third party who confirms the check data can use the camera device to confirm the check data and incorrectness.

In the above configuration, further provided is a calculation unit that calculates moving speed of the camera device with use of the current time and the current position included in the image capturing information and the current time and the current position included in the stored information, the image capturing information and the stored information including the same identification information.

In a case where the moving speed of the camera device is high (for example, 100 km/h), it is considered that the camera device is not in use (the cooling unit is not in operation) but is moving. In a case where the moving speed of the camera device is high while the camera device is in use (for example, in a case where the operating time included in the image capturing information and the operating time included in the stored information are close, it is estimated that the camera device is in use), the third party who confirms the check data can determine that the check data is incorrect.

In the above configuration, further provided, is a determination unit that determines Whether or not the moving speed is abnormal.

With this configuration, it is possible to determine whether or not the moving speed of the camera device is abnormal. For example, the determination unit determines that the moving speed is abnormal in a case where the moving speed exceeds a predetermined threshold value and determines that the moving speed is not abnormal in a case where the moving speed is equal to or lower than the threshold value.

A gas leakage check system according to a second aspect is a gas leakage check system including the camera device and the server device, and the server device includes a second output unit that outputs the image associated with the image capturing information, the image capturing information, and the stored information.

With the gas leakage check system according to the second aspect, the third party who confirms the check data can use the server device to confirm the check data and incorrectness.

In the above configuration, the server device further includes a second calculation unit that calculates moving speed of the camera device with use of the current time and the current position included in the image capturing information and the current time and the current position included in the stored information, the image capturing information and the stored information including the same identification information.

With this configuration, the moving speed of the camera device can be derived on the server device.

In the above configuration, the server device further includes a second determination unit that determines whether or not the moving speed is abnormal.

With this configuration, the server device can determine whether or not the moving speed of the camera device is abnormal.

A gas leakage check system according to a third aspect is a gas leakage check system including the camera device, the server device, and an information processing device that enables communication with the server device, and the information processing device includes a third output unit that outputs the image associated with the image capturing information, the image capturing information, and the stored information.

With the gas leakage check system according to the third aspect, the third party who confirms the check data can use the information processing device to confirm the check data and incorrectness.

In the above configuration, the information processing device further includes a third calculation unit that calculates moving speed of the camera device with use of the current time and the current position included in the image capturing information and the current time and the current position included in the stored information, the image capturing information and the stored information including the same identification information.

With this configuration, the moving speed of the camera device can be derived on the information processing device.

In the above configuration, the information processing device further includes a third determination unit that determines whether or not the moving speed is abnormal.

With this configuration, the information processing device can determine whether or not the moving speed of the camera device is abnormal.

A gas leakage check method according to a fourth aspect is a gas leakage check method with use of a camera device including an imaging element that captures an infrared image, a cooling unit that cools the imaging element, a measurement unit that measures operating time of the cooling unit, a reception unit that receives a GPS signal, an acquisition unit that acquires current time and a current position of the camera device with use of the GPS signal, and a storage unit that stores identification information of the camera device and includes a first generation step, by a first generation unit, of generating stored information stored in a server device, the stored information including the current time and the current position acquired by the acquisition unit during an operating term of the cooling unit, the operating time measured by the measurement unit during the operating term, and the identification information stored in the storage unit, a communication step, by a communication unit, of transmitting the stored information to the server device, a second generation step, by a second generation unit, of generating image capturing information associated with an image, the image capturing information including the current time and the current position acquired by the acquisition unit during the operating term, the operating time measured by the measurement unit during the operating term, and the identification information stored in the storage unit, and a third generation step, by a third generation unit, of generating the image associated with the image capturing information based on the infrared image captured by the imaging element during the operating term.

The gas leakage check method according to the fourth aspect defines the camera device according to the first aspect from the viewpoint of the method and exerts a similar effect to that of the camera device according to the first aspect.

A gas leakage check program according to a fifth aspect is a gas leakage check program for a gas leakage check with use of a camera device including an imaging element that captures an infrared image, a cooling unit that cools the imaging element, a measurement unit that measures operating time of the cooling unit, a reception unit that receives a GPS signal, an acquisition unit that acquires current time and a current position of the camera device with use of the GPS signal, and a storage unit that stores identification information of the camera device and causes a computer to execute a first generation step of generating stored information stored in a server device, the stored information including the current time and the current position acquired by the acquisition unit during an operating term of the cooling unit, the operating time measured by the measurement unit during the operating term, and the identification information stored in the storage unit, a communication step of transmitting the stored information to the server device, a second generation step of generating image capturing information associated with an image, the image capturing information including the current time and the current position acquired by the acquisition unit during the operating term, the operating time measured by the measurement unit during the operating term, and the identification information stored in the storage unit, and a third generation step of generating the image associated with the image capturing information based on the infrared image captured by the imaging element during the operating term.

The gas leakage check program according to the fifth aspect defines the camera device according to the first aspect from the viewpoint of the program and exerts a similar effect to that of the camera device according to the first aspect.

Although embodiments of the present invention have been illustrated in the drawings and described in detail, the embodiments are merely illustrative, and the present invention is not limited to the embodiments. The scope of the present invention shall be construed by wording of the appended claims.

The entire disclosure of Japanese Patent Application No. 2018-094867 filed on May 16, 2018 is incorporated herein by reference in its entirety.

INDUSTRIAL APPLICABILITY

According to the present invention, it is possible to provide a camera device, a gas leakage check system, a gas leakage check method, and a gas leakage check program.

The invention claimed is:
1. A camera device for use in gas detection based on an infrared image, comprising:
an imaging element that captures the infrared image;
a cooler that cools the imaging element;
a measurer that measures operating time of the cooler;
a receptor that receives a Global Positioning System (GPS) signal;
a first hardware processor that acquires current time and a current position of the camera device with use of the GPS signal;
a storage that stores identification information of the camera device;

a second hardware processor that generates stored information stored in a server device, the stored information including the current time and the current position acquired by the first hardware processor during an operating term of the cooler, the operating time measured by the measurer during the operating term, and the identification information stored in the storage;

a communicator that transmits the stored information to the server device;

a third hardware processor that generates image capturing information associated with an image, the image capturing information including the current time and the current position acquired by the first hardware processor during the operating term, the operating time measured by the measurer during the operating term, and the identification information stored in the storage; and a fourth hardware processor that generates the image associated with the image capturing information based on the infrared image captured by the imaging element during the operating term.

2. The camera device according to claim 1, further comprising a sixth hardware processor that performs image processing on the infrared image captured by the imaging element in order for a figure illustrating leaking gas to be seen easily to generate the image.

3. The camera device according to claim 1, wherein the third hardware processor generates the image capturing information including the current time and the current position acquired with use of the GPS signal received by the receptor during an image capturing term which is included in the operating term and in which the imaging element is capturing the infrared image, the operating time measured by the measurer during the image capturing term, and the identification information stored in the storage, and in a case where the receptor cannot receive the GPS signal during the image capturing term, the third hardware processor includes in the image capturing information the current time and the current position included in the stored information generated at a closest time.

4. The camera device according to claim 1, further comprising an outputter that outputs the image associated with the image capturing information, the image capturing information, and the stored information.

5. The camera device according to claim 1, further comprising a seventh hardware processor that calculates moving speed of the camera device with use of the current time and the current position included in the image capturing information and the current time and the current position included in the stored information, the image capturing information and the stored information including the same identification information.

6. The camera device according to claim 5, further comprising an eighth hardware processor that determines whether or not the moving speed is abnormal.

7. A gas leakage check system comprising:
the camera device according to claim 1; and
the server device,
wherein the server device includes a second outputter that outputs the image associated with the image capturing information, the image capturing information, and the stored information.

8. The gas leakage check system according to claim 7, wherein the server device further includes a ninth hardware processor that calculates moving speed of the camera device with use of the current time and the current position included in the image capturing information and the current time and the current position included in the stored information, the image capturing information and the stored information including the same identification information.

9. The gas leakage check system according to claim 8, wherein the server device further includes a tenth hardware processor that determines whether or not the moving speed is abnormal.

10. A gas leakage check system comprising:
the camera device according to claim 1;
the server device; and
an information processing device that enables communication with the server device,
wherein the information processing device includes a third outputter that outputs the image associated with the image capturing information, the image capturing information, and the stored information.

11. The gas leakage check system according to claim 10, wherein the information processing device further includes an eleventh hardware processor that calculates moving speed of the camera device with use of the current time and the current position included in the image capturing information and the current time and the current position included in the stored information, the image capturing information and the stored information including the same identification information.

12. The gas leakage check system according to claim 11, wherein the information processing device further includes a twelfth hardware processor that determines whether or not the moving speed is abnormal.

13. The camera device according to claim 1, further comprising a fifth hardware processor that generates gas check report data including the image.

14. The camera device according to claim 13, further comprising a sixth hardware processor that performs image processing on the infrared image captured by the imaging element in order for a figure illustrating leaking gas to be seen easily to generate the image.

15. The camera device according to claim 13, wherein the third hardware processor generates the image capturing information including the current time and the current position acquired with use of the GPS signal received by the receptor during an image capturing term which is included in the operating term and in which the imaging element is capturing the infrared image, the operating time measured by the measurer during the image capturing term, and the identification information stored in the storage, and in a case where the receptor cannot receive the GPS signal during the image capturing term, the third hardware processor includes in the image capturing information the current time and the current position included in the stored information generated at a closest time.

16. The camera device according to claim 13, further comprising an outputter that outputs the image associated with the image capturing information, the image capturing information, and the stored information.

17. The camera device according to claim 13, further comprising a seventh hardware processor that calculates moving speed of the camera device with use of the current time and the current position included in the image capturing information and the current time and the current position included in the stored information, the image capturing information and the stored information including the same identification information.

18. A gas leakage check system comprising:
the camera device according to claim 13; and
the server device, wherein the server device includes a second outputter that outputs the image associated with the image capturing information, the image capturing information, and the stored information.

19. A gas leakage check method with use of a camera device, the method comprising:
    capturing, by an imaging element, an infrared image;
    cooling, by a cooler, the imaging element;
    measuring, by a measurer, operating time of the cooler;
    receiving, by a receptor, a Global Positioning System (GPS) signal;
    acquiring, by a first hardware processor, current time and a current position of the camera device with use of the GPS signal;
    storing, by a storage, identification information of the camera device;
    generating, by a second hardware processor, stored information stored in a server device, the stored information including the current time and the current position acquired by the first hardware processor during an operating term of the cooler, the operating time measured by the measurer during the operating term, and the identification information stored in the storage;
    transmitting, by a communicator, the stored information to the server device;
    generating, by a third hardware processor, image capturing information associated with an image, the image capturing information including the current time and the current position acquired by the first hardware processor during the operating term, the operating time measured by the measurer during the operating term, and the identification information stored in the storage; and
    generating, by a fourth hardware processor, the image associated with the image capturing information based on the infrared image captured by the imaging element during the operating term.

20. A non-transitory recording medium storing a computer readable gas leakage check program for a gas leakage check with use of a camera device, the gas leakage check program causing a computer to:
    capture, by an imaging element, an infrared image;
    cool, by a cooler, the imaging element;
    measure, by a measurer, operating time of the cooler;
    receive, by a receptor, a Global Positioning System (GPS) signal;
    acquire, by a first hardware processor, that acquires current time and a current position of the camera device with use of the GPS signal;
    store, by a storage, identification information of the camera device;
    generate stored information stored in a server device, the stored information including the current time and the current position acquired by the first hardware processor during an operating term of the cooler, the operating time measured by the measurer during the operating term, and the identification information stored in the storage;
    transmit the stored information to the server device;
    generate image capturing information associated with an image, the image capturing information including the current time and the current position acquired by the first hardware processor during the operating term, the operating time measured by the measurer during the operating term, and the identification information stored in the storage; and
    generate the image associated with the image capturing information based on the infrared image captured by the imaging element during the operating term.

* * * * *